(12) United States Patent
Jung et al.

(10) Patent No.: US 11,395,290 B2
(45) Date of Patent: Jul. 19, 2022

(54) TERMINAL AND CONTROL METHOD THEREOF IN WIRELESS COMMUNICATION SYSTEM

(71) Applicant: Samsung Electronics Co., Ltd., Gyeonggi-do (KR)

(72) Inventors: Euichang Jung, Gyeonggi-do (KR); Suyoung Park, Gyeonggi-do (KR); Suha Yoon, Gyeonggi-do (KR); Sunghyuk Shin, Gyeonggi-do (KR); Jaebong Chun, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 17/046,205

(22) PCT Filed: Apr. 11, 2019

(86) PCT No.: PCT/KR2019/004369
§ 371 (c)(1),
(2) Date: Oct. 8, 2020

(87) PCT Pub. No.: WO2019/199084
PCT Pub. Date: Oct. 17, 2019

(65) Prior Publication Data
US 2021/0168784 A1 Jun. 3, 2021

(30) Foreign Application Priority Data

Apr. 12, 2018 (KR) ........................ 10-2018-0042726

(51) Int. Cl.
*H04W 72/04* (2009.01)
*H04B 7/0408* (2017.01)
*H04W 72/08* (2009.01)

(52) U.S. Cl.
CPC ........ *H04W 72/044* (2013.01); *H04B 7/0408* (2013.01); *H04W 72/048* (2013.01); *H04W 72/085* (2013.01)

(58) Field of Classification Search
CPC ............. H04W 72/044; H04W 72/048; H04W 72/085; H04W 76/27; H04W 72/046;
(Continued)

(56) References Cited

U.S. PATENT DOCUMENTS

| 8,265,054 B2 | 9/2012 | Tsutsui |
| 9,900,891 B1 | 2/2018 | Islam et al. |

(Continued)

FOREIGN PATENT DOCUMENTS

| KR | 1020160063020 | 6/2016 |
| KR | 1020180023515 | 3/2018 |
| WO | WO2018030811 | 2/2018 |

OTHER PUBLICATIONS

PCT/ISA/210 Search Report issued on PCT/KR2019/004369, dated Jul. 19, 2019, pp. 5.
(Continued)

*Primary Examiner* — Ivan O Latorre
(74) *Attorney, Agent, or Firm* — The Farrell Law Firm, P.C.

(57) ABSTRACT

The present disclosure relates to a 5G or pre-5G communication system for supporting higher data transfer rates than that of a beyond 4G communication system such as LTE. A control method of a terminal in a wireless communication system, according to an embodiment of the present invention, may comprise the steps of: receiving radio resource control signaling (RRC signaling) for a signal measured by a terminal; identifying a transmission interval of a signal measured by the terminal, on the basis of the received RRC signaling; identifying first information for forming a prede-
(Continued)

termined beam; and determining whether to change the first information for forming a beam to second information for forming a beam, on the basis of the identified transmission interval.

4 Claims, 21 Drawing Sheets

(58) Field of Classification Search
CPC .. H04W 72/02; H04W 72/042; H04B 7/0408; H04B 7/088; H04B 7/0695; H04B 7/0617
See application file for complete search history.

(56) References Cited

U.S. PATENT DOCUMENTS

| | | | | |
|---|---|---|---|---|
| 10,856,316 | B2* | 12/2020 | Liou | H04W 72/1289 |
| 11,057,863 | B2* | 7/2021 | Moriwaki | H04W 24/08 |
| 2009/0179797 | A1* | 7/2009 | Kwon | H01Q 1/246 |
| | | | | 342/368 |
| 2010/0159936 | A1* | 6/2010 | Brisebois | H04W 72/085 |
| | | | | 455/450 |
| 2012/0322453 | A1* | 12/2012 | Weng | H04W 72/02 |
| | | | | 455/450 |
| 2016/0150435 | A1 | 5/2016 | Baek et al. | |
| 2018/0048375 | A1 | 2/2018 | Guo et al. | |
| 2018/0062717 | A1 | 3/2018 | Mok et al. | |
| 2018/0227899 | A1* | 8/2018 | Yu | H04B 7/02 |
| 2018/0309496 | A1* | 10/2018 | Lee | H04L 5/0053 |
| 2018/0367203 | A1* | 12/2018 | Nilsson | H04B 7/0617 |
| 2019/0215117 | A1* | 7/2019 | Lee | H04L 5/0051 |
| 2019/0261244 | A1* | 8/2019 | Jung | H04L 1/20 |
| 2019/0297648 | A1* | 9/2019 | Nagaraja | H04B 17/336 |
| 2019/0349960 | A1* | 11/2019 | Li | H04W 72/1242 |
| 2020/0059398 | A1* | 2/2020 | Pan | H04L 5/0048 |
| 2020/0120634 | A1* | 4/2020 | Lee | H04W 48/10 |
| 2020/0267571 | A1* | 8/2020 | Park | H04W 72/046 |
| 2020/0274657 | A1* | 8/2020 | Deenoo | H04L 1/0026 |
| 2020/0288479 | A1* | 9/2020 | Xi | H04B 7/02 |
| 2020/0374960 | A1* | 11/2020 | Deenoo | H04W 72/14 |

OTHER PUBLICATIONS

PCT/ISA/237 Written Opinion issued on PCT/KR2019/004369, dated Jul. 19, 2019, pp. 4.
Huawei, "Remaining issues on beam failure recovery", R1-1801454, 3GPP TSG RAN WG1 Meeting #92, dated Feb. 16, 2018, pp. 10.
ZTE, "Remaining details on beam recovery", R1-1801582, 3GPP TSG RAN WG1 Meeting #92, 2Feb. 16, 2018, pp. 8.
Samsung, "On Beam Indication", R1-1713595, 3GPP TSG RAN WG1 NR #90, Aug. 21-25, 2017, 10 pages.
Qualcomm, "Beam Management for NR", R1-1802823, 3GPP TSG-RAN WG1 Meeting #92, Feb. 26-Mar. 2, 2018, 5 pages.
InterDigital, Inc., "Remaining Issues on Beam Recovery for NR", R1-1708336, 3GPP TSG RAN WG1 Meeting #89 May 15-19, 2017, 5 pages.
Korean Office Action dated May 10, 2022 issued in counterpart application No. 10-2018-0042726, 10 pages.

* cited by examiner

FIG. 5C

| 43 | 44 | 45 | 46 | 47 | 48 | 49 |
|----|----|----|----|----|----|----|
| 36 | 37 | 38 | 39 | 40 | 41 | 42 |
| 29 | 30 | 31 | 32 | 33 | 34 | 35 |
| 22 | 23 | 24 | 25 | 26 | 27 | 28 |
| 15 | 16 | 17 | 18 | 19 | 20 | 21 |
| 8  | 9  | 10 | 11 | 12 | 13 | 14 |
| 1  | 2  | 3  | 4  | 5  | 6  | 7  |

FIG. 8C

TERMINAL AND CONTROL METHOD THEREOF IN WIRELESS COMMUNICATION SYSTEM

PRIORITY

This application is a National Phase Entry of PCT International Application No. PCT/KR2019/004369 which was filed on Apr. 11, 2019, and claims priority to Korean Patent Application No. 10-2018-0042726, which was filed on Apr. 12, 2018, the content of each of which is incorporated herein by reference.

TECHNICAL FIELD

The disclosure relates to a wireless communication system and, more particularly, to a method and an apparatus for optimizing the transmission/reception beams according to the signaling scenario of a base station and the operation scenario of a terminal in the 5G wireless communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System".

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

Meanwhile, in a 5G wireless communication system, the necessity of a method for optimizing a transmission/reception beam according to signaling of a base station and an operation scenario of a terminal has emerged.

DESCRIPTION OF INVENTION

Technical Problem

Due to the above-mentioned necessity, this disclosure aims to optimize the transmission/reception beam according to the signaling of a base station and the operation scenario of a terminal in a 5G wireless communication system.

Solution to Problem

A control method of a terminal in a wireless communication system according to an embodiment of the disclosure may include receiving radio resource control (RRC) signaling for a signal measured by the terminal, identifying a transmission interval of the signal measured by the terminal, based on the received RRC signaling, identifying a preconfigured first beam book, and determining whether to change the first beam book to a second beam book, based on the identified transmission interval.

A control method of a terminal in a wireless communication system, according to another embodiment of the disclosure may include identifying first beam book including information on a plurality of preconfigured beams, and changing the first beam book to the second beam book when an event in which the number of transmission/reception beams is changed occurs.

A terminal in a wireless communication system according to another embodiment of the disclosure may include a transceiver configured to transmit and receive a signal, and a controller configured to control the transceiver to receive radio resource control signaling (RRC signaling) for a signal measured by the terminal, identify the transmission interval of a signal measured by the terminal, based on the received RRC signaling, identify a preconfigured first beam book, and determine whether to change the first beam book to a second beam book, based on the identified transmission interval.

A terminal in a wireless communication system according to another embodiment of the disclosure may include a transceiver configured to transmit and receive a signal, and a controller configured to identify a first beam book including information on a plurality of preconfigured beams, and change the first beam book to a second beam book, when an event in which the number of transmission/reception beams is changed occurs.

Advantageous Effects of Invention

Through the disclosure, in the 5G wireless communication system, the terminal can optimize the transmit/receive beam by changing or modifying the beam book according to the signaling of the base station and the operation scenario of the terminal.

BRIEF DESCRIPTION OF DRAWINGS

FIGS. 5A to 5C are views illustrating beamforming according to various embodiments;

FIGS. 8A to 8C are views illustrating a method of selecting a portion from an arbitrary beam book according to an embodiment of the disclosure;

MODE FOR THE INVENTION

Figure 1:
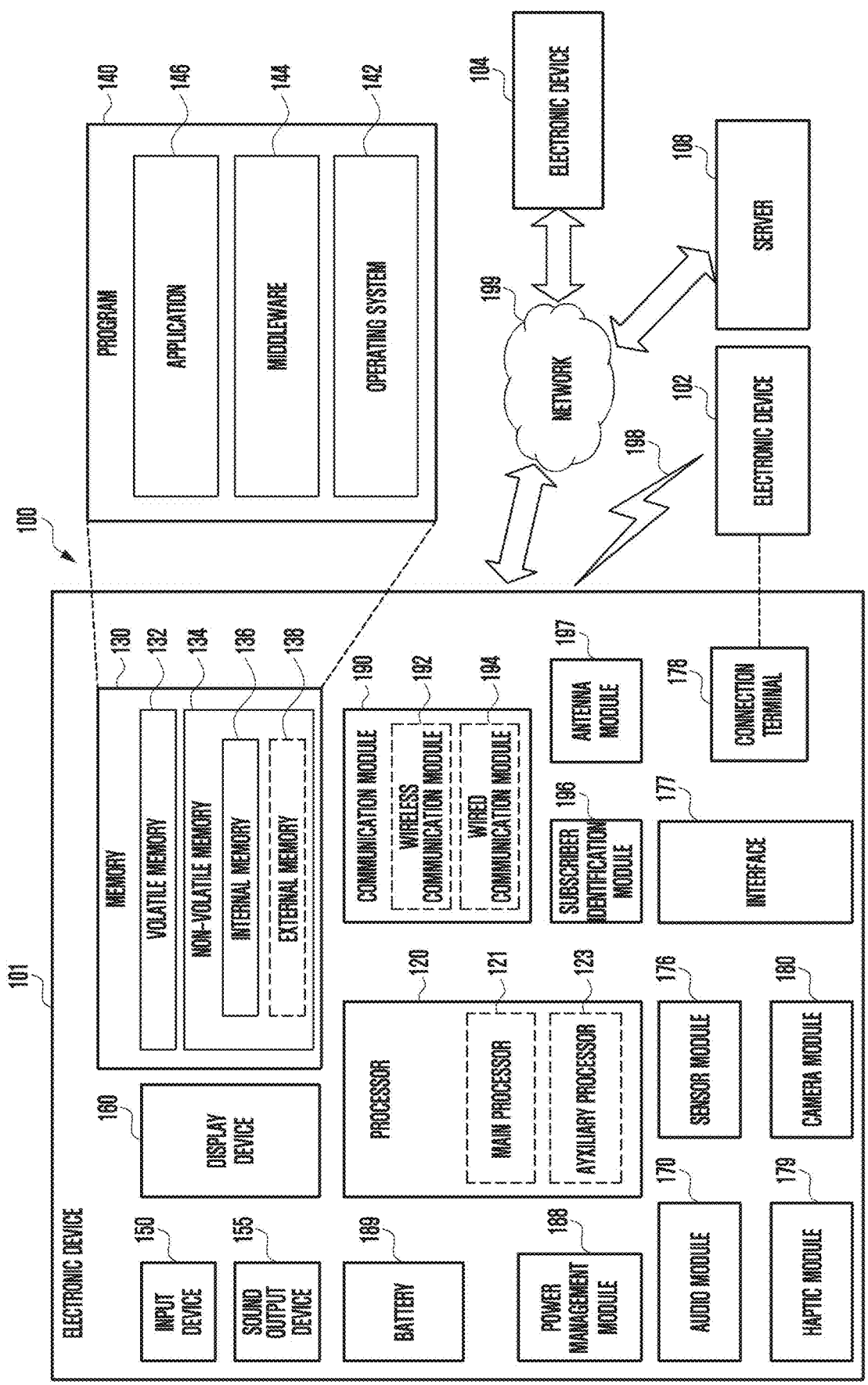
FIG. 1 is a block diagram of an electronic device in a network environment according to various embodiments.

Hereinafter, embodiments of the disclosure will be described in detail with reference to the accompanying drawings.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card.

In the disclosure, a terminal may generally include a mobile terminal, and may refer to a device which has already subscribed to a mobile communication system and is provided with services from the mobile communication system. The mobile terminal may include a smart device such as a smartphone or a tablet PC, but this device is merely an example of the mobile terminal and the disclosure is not limited thereto.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, the disclosure uses terms and names defined in 3rd generation partnership project long term evolution (3GPP LTE) standards for the convenience of description. However, the disclosure is not limited by these terms and names, and may be applied in the same way to systems that conform other standards.

The structure of the next generation mobile communication system to which the disclosure can be applied will be briefly described. The radio access network of the next generation mobile communication system (hereinafter referred to as new radio (NR) or 5G) is composed of a next generation base station (new radio node B, hereinafter, referred to as NR gNB or NR base station) and a new radio core network (NR CN). The user terminal (new radio user equipment, hereinafter referred to as NR UE or terminal) accesses an external network through NR gNB and NR CN.

The NR gNB corresponds to the evolved node B (eNB) of the existing LTE system. The NR gNB is connected to the NR UE through a radio channel and can provide superior service than the existing Node B. In the next generation mobile communication system, since all user traffic is serviced through a shared channel, a device is required to perform scheduling by collecting status information such as the buffer state, available transmission power state, and channel state of UEs, and NR NB is in charge. One NR gNB usually controls multiple cells. In order to implement ultra-fast data transmission compared to the current LTE, it may have more than the existing maximum bandwidth, and an orthogonal frequency division multiplexing (hereinafter referred to as OFDM) method may be additionally applied to the beamforming technology using a radio access technology. In addition, an adaptive modulation & coding (hereinafter referred to as AMC) scheme is applied to determine a modulation scheme and a channel coding rate according to a channel state of a terminal. The NR CN performs functions such as mobility support, bearer configuration, and QoS configuration. NR CN is a device that is responsible for various control functions as well as mobility management functions for terminals, and is connected to multiple base stations. In addition, the next-generation mobile communication system can be linked with the existing LTE system, and the NR CN is connected to the MME through a network interface. The MME is connected to the existing base station, eNB.

The base station described below according to an embodiment of the disclosure may refer to a 5G base station that transmits a signal using a beam formed by beamforming in an ultra-high frequency (mmWave) band as described above.

FIG. 1 is a block diagram of an electronic device 101 in a network environment 100, according to various embodiments. Referring to FIG. 1, in the network environment 100, the electronic device 101 may communicate with an electronic device 102 via a first network 198 (e.g., short distance wireless communication network), or may communicate with an electronic device 104 or a server 108 via a second network 199 (e.g., long distance wireless communication network). According to an embodiment, the electronic device 101 may communicate with the electronic device 104 via the server 108. According to an embodiment, the electronic device 101 may include a processor 120, a memory 130, an input device 150, an audio output device 155, a display device 160, an audio module 170, a sensor module 176, an interface 177, a haptic module 179, a camera module 180, a power management module 188, a battery 189, a communication module 190, a subscriber identification module 196, or an antenna module 197. In some embodiments, at least one of the components (e.g., the display device 160 or the camera module 180) may be omitted or one or more other components may be added to the electronic device 101. In some embodiments, some of these components may be implemented as one integrated circuit. For example, the sensor module 176 (e.g., a fingerprint sensor, an iris sensor, or an illuminance sensor) may be implemented while being embedded in the display device 160 (e.g., a display).

The processor 120 may execute, for example, software (e.g., the program 140) to control at least one other component (e.g., hardware or software component) of the electronic device 101 connected to the processor 120, and may perform various data processing or operations. According to an embodiment, as at least a part of data processing or operation, the processor 120 may load instructions or data received from other components (e.g., the sensor module 176 or the communication module 190) into a volatile memory 132, process the instructions or data stored in the volatile memory 132, and store the result data in the non-volatile memory 134. According to an embodiment, the processor 120 may include a main processor 121 (e.g., a central processing unit or an application processor), and an auxiliary processor 123 (e.g., a graphics processing unit, an image signal processor, a sensor hub processor, or communication processor) that can be operated independently or together with the main processor. Additionally or alternatively, the auxiliary processor 123 may be configured to use lower power than the main processor 121, or to be specialized for a designated function. The auxiliary processor 123 may be implemented separately from the main processor 121 or as part of the main processor 121.

The auxiliary processor 123 may control at least some of functions or states related to at least one component (e.g., the display device 160, the sensor module 176, or the communication module 190) among the components of the electronic device 101, for example, instead of the main processor 121 while the main processor 121 is in an inactive (e.g., sleep) state, or with the main processor 121 while the main processor 121 is in an active (e.g., execute an application) state. According to an embodiment, the auxiliary processor 123 (e.g., an image signal processor or communication processor) may be implemented as a part of other functionally related components (e.g., the camera module 180 or the communication module 190).

The memory 130 may store various data used by at least one component of the electronic device 101 (e.g., the processor 120 or the sensor module 176). The data may include, for example, software (e.g., the program 140) and input data or output data for commands related thereto. The memory 130 may include a volatile memory 132 or a nonvolatile memory 134.

The program 140 may be stored as software in the memory 130, and may include, for example, an operating system 142, middleware 144, or an application 146.

The input device 150 may receive commands or data to be used for components (e.g., the processor 120) of the electronic device 101 from outside (e.g., a user) of the electronic device 101. The input device 150 may include, for example, a microphone, a mouse, or a keyboard.

The audio output device 155 may output an audio signal to the outside of the electronic device 101. The audio output device 155 may include, for example, a speaker or a receiver. The speaker may be used for general purposes such as multimedia playback or recording playback, and the receiver may be used to receive an incoming call. According to one embodiment, the receiver may be implemented separately from the speaker, or as part thereof.

The display device 160 may visually provide information to the outside of the electronic device 101 (e.g., a user). The display device 160 may include, for example, a display, a hologram device, or a projector and a control circuit for controlling the device. According to an embodiment of the disclosure, the display device 160 may include a touch circuitry configured to sense a touch, or a sensor circuit (e.g., a pressure sensor) configured to measure the strength of the force generated by the touch.

The audio module 170 may convert sound into an electrical signal, or vice versa. According to an embodiment, the audio module 170 may acquire sound through the input device 150 or may output sound through an audio output device 155, and an external electronic device (e.g., the electronic device 102) (e.g., a speaker or headphones) directly or wirelessly connected to the electronic device 101.

The sensor module 176 may detect an operating state (e.g., power or temperature) of the electronic device 101 or an external environmental state (e.g., a user state), and may produce an electrical signal or data value corresponding to the detected state. According to an embodiment, the sensor module 176 may include, for example, a gesture sensor, a gyro sensor, a barometric pressure sensor, a magnetic sensor, an acceleration sensor, a grip sensor, a proximity sensor, a color sensor, an infrared (IR) sensor, a biological sensor, a temperature sensor, a humidity sensor, or an illuminance sensor.

The interface 177 may support one or more designated protocols that can be used for the electronic device 101 to be directly or wirelessly connected to an external electronic device (e.g., the electronic device 102). According to an embodiment, the interface 177 may include, for example, a high definition multimedia interface (HDMI), a universal serial bus (USB) interface, an SD card interface, or an audio interface.

The connection terminal 178 may include a connector through which the electronic device 101 can be physically connected to an external electronic device (e.g., the electronic device 102). According to an embodiment, the connection terminal 178 may include, for example, an HDMI connector, a USB connector, an SD card connector, or an audio connector (e.g., a headphone connector).

The haptic module 179 may convert electrical signals into mechanical stimuli (e.g., vibration or movement) or electrical stimuli that the user can perceive through tactile or kinesthesis. According to an embodiment, the haptic module 179 may include, for example, a motor, a piezoelectric element, or an electrical stimulation device.

The camera module 180 may capture still images and videos. According to an embodiment, the camera module 180 may include one or more lenses, image sensors, image signal processors, or flashes.

The power management module 188 may manage power supplied to the electronic device 101. According to an embodiment, the power management module 388 may be implemented, for example, as at least a part of a power management integrated circuit (PMIC).

The battery 189 may supply power to at least one component of the electronic device 101. According to an embodiment, the battery 189 may include, for example, a non-rechargeable primary cell, a rechargeable secondary cell, or a fuel cell.

The communication module 190 may support establishing a direct (e.g., wired) communication channel or a wireless communication channel between the electronic device 101 and an external electronic device (e.g., the electronic device 102, the electronic device 104, or the server 108), and performing communication via the established communication channel. The communication module 190 may be operated independently of the processor 120 (e.g., an application processor), and may include one or more communication processors supporting direct (e.g., wired) communication or wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication module). Corresponding communication module among these communication modules may communicate with an external electronic device through the first network 198 (e.g., a short-range communication network such as Bluetooth, WiFi direct, or infrared data association (IrDA)) or the second network 199 (e.g., a long distance communication network such as a cellular network, the Internet, or a computer network (e.g., LAN or WAN)). These various types of communication modules may be integrated into a single component (e.g., a single chip), or may be implemented as a plurality of separate components (e.g., multiple chips). The wireless communication module 192 may identify and authenticate the electronic device 101 within a communication network such as the first network 198 or the second network 199 using subscriber information (e.g., international mobile subscriber identifier (IMSI)) stored in the subscriber identification module 196.

The antenna module 197 may transmit a signal or power to the outside (e.g., an external electronic device) or receive it from the outside. According to an embodiment, the antenna module 197 may include one or more antennas, and therefrom, at least one antenna suitable for a communication method used in a communication network such as the first network 198 or the second network 199 may be selected, for example, by the communication module 190. The signal or power may be transmitted or received between the communication module 190 and an external electronic device through the at least one selected antenna.

At least some of the components may be connected to each other via a communication method between peripheral devices (e.g., a bus, a general purpose input and output (GPIO), a serial peripheral interface (SPI), or a mobile industry processor interface (MIPI)) and exchange signals (e.g., commands or data) with each other.

According to an embodiment, the command or data may be transmitted or received between the electronic device 101 and the external electronic device 104 through the server 108 connected to the second network 199. Each of the electronic devices 102 and 104 may be the same or a different type of device from the electronic device 101. According to an embodiment, all or some of the operations performed on the electronic device 101 may be performed on one or more external devices of the external electronic devices 102, 104, or 108. For example, when the electronic device 101 needs to perform a certain function or service automatically or in response to a request from a user or another device, the electronic device 101 may request one or more external electronic devices to perform at least a part of the function or service instead of or additionally to executing the function or service itself. The one or more external electronic devices received the request may execute at least a part of the requested function or service, or an additional function or service related to the request, and deliver the result of the execution to the electronic device 101. The electronic device 101 may process the result, as it is or additionally, and provide it as at least part of a response to the request. To this end, cloud computing, distributed computing, or client-server computing technology may be used, for example.

Figure 2:
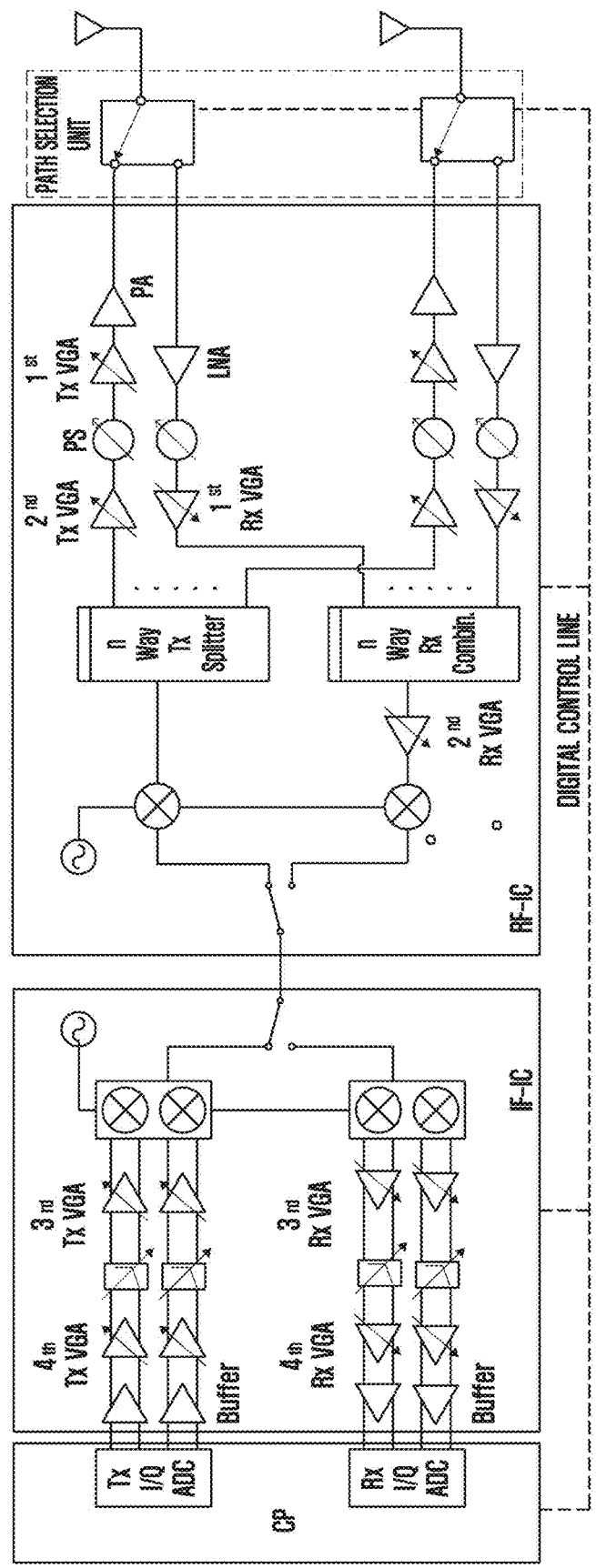
FIG. 2 is a view illustrating a beamforming communication circuit according to various embodiments.

FIG. 2 is a view illustrating a beamforming communication circuit having n chains and capable of processing one data stream. The digital control line inside the IC is omitted. The beamforming communication circuit may be composed of a central processor (CP), intermediate frequency integrated circuit (IF-IC), a radio frequency integrated circuit (RF-IC), a switch, a supply modulator, a digital control line MIPI of a beamforming enveloper, I2C, PCIe, UART, USB, GPIO, etc.

As illustrated in FIG. 2, n antennas are arranged at a distance d. At this time, the antenna is connected to the switch and selectively connects to the Tx chain when transmitting (Tx) and the Rx chain when receiving (Rx) during time duplex division (TDD) communication.

The transmission chain includes a power amplifier (PA), a first variable gain amplifier (1=VGA), a phase shifter (PS), a second variable gain amplifier ($2^{nd}$ VGA), an n-way Tx splitter, and a mixer within the RF-IC.

The PA plays a role of amplifying the power of the Tx signal. The PA may be mounted inside the RF-IC or outside the RF-IC. Each VGA is controlled by a CP and performs TX auto gain control (AGC) operation. The number of VGAs can be increased or decreased in some cases. PS shifts the phase of the signal according to the beamforming angle under the control of the CP. The n Way Splitter separates and generates the Tx signal received from the Mixer into n signals. The mixer up-converts the transmission intermediate frequency (Tx-IF) signal received from the intermediate frequency processing integrated circuit (IF-IC) into a Tx signal (RF band). The mixer may receive a signal to mix from the internal or external oscillator.

The reception chain may include a low noise amplifier (LNA), a PS, a 1st VGA, an n way Rx combiner, a 2nd Rx VGA, a mixer within RF-IC.

The LNA serves as a low-noise amplification of the signal received from the antenna. Each VGA is controlled by the CP and performs Rx auto gain control (AGC) operation. The number of VGAs may be increased or decreased in some cases. The PS shifts the phase of the signal according to the beamforming angle under the control of the CP. The n Way Combiner combines signals that are phase shifted and aligned in phase. The combined signal is transmitted to the mixer through the 2nd VGA. The mixer down-converts the received signal from the RF band to the IF band. The mixer may receive a signal to mix from the internal or external oscillator.

A switch that selectively connects the Rx/Tx Chain to the rear of the mixer in the RF-IC is further included. If the IF frequency is high, it may be difficult to connect the transmission line between RF-IC/IF-IC. When TDD/Rx Chain is selectively connected during TDD operation with the switch, the number of transmission lines of RF-IC/IF-IC can be reduced.

Like the RF-IC, the IF-IC also includes a switch that selectively connects the Rx/Tx chain.

The Tx chain inside the IF-IC includes a quadrature mixer, a third variable gain amplifier ($3^{rd}$ VGA), a low pass filter (LPF), a fourth variable gain amplifier ($4^{th}$ VGA), and a buffer. The buffer serves as a buffer when receiving a balanced Tx I/Q signal from the CP, so that the signal can be stably processed. The $3^{rd}$ VGA and 4th VGA are controlled by CP and act as Tx AGC. The LPF operates as a channel filter by operating the bandwidth of the baseband Tx IQ signal at a cutoff frequency. The cutoff frequency is variable. The quadrature mixer upconverts the balanced Tx I/Q signal to the Tx-IF signal.

The Rx chain inside the IF-IC includes a quadrature mixer, a $3^{rd}$ VGA, a low pass filter (LPF), a $4^{th}$ VGA, and a buffer. The buffer acts as a buffer when delivering balanced Rx I/Q through the $4^{th}$ VGA to the CP, so that signals can be stably processed. The $3^{rd}$ VGA and $4^{th}$ VGA are controlled by the CP and act as Rx AGC. The LPF operates as a channel filter by operating the bandwidth of the balanced Rx IQ signal in the baseband at a cutoff frequency. The cutoff frequency is variable. The quadrature mixer down-converts to an Rx-IF signal to perform a balanced Rx I/Q signal generation operation.

The Tx I/Q DAC in the CP converts the digital signal modulated by a modem into a balanced Tx I/Q signal and transmits the same to the IF-IC. The Rx I/Q ADC in the CP converts the balanced Rx I/Q signals down-converted by the IF-IC into digital signals and transmits the same to the modem.

In the LTE and NR, various downlink reference signals (DL RSs) have been designed for a terminal to measure and estimate a channel of a base station. Accordingly, basic signaling for beam operation may exist based on the various DL RSs. The terminal may form a single beam book.

The beam book may include information about an antenna element, a power level and a phase shift used to form an arbitrary beam, as shown in Table 1 below.

TABLE 1

| Beam book Index (3 × 3) | Antenna element Utilize 4 (0-15) | Power adjustment level (#0-#6) | Phase shift ($\theta_0, \theta_1, \theta_2, \theta_3, \theta_4$) |
| --- | --- | --- | --- |
| 0000 | Index (5, 6, 9, 10) | (#5, #3, #3, #5) | ($\theta_0, \theta_1, \theta_2, \theta_3$) |
| 0001 | Index (5, 6, 9, 10) | (#5, #3, #3, #5) | ($\theta_0, \theta_1, \theta_3, \theta_4$) |
| 0010 | Index (5, 6, 9, 10) | (#5, #3, #3, #5) | ($\theta_0, \theta_2, \theta_2, \theta_3$) |
| 0011 | Index (5, 6, 9, 10) | (#3, #4, #4, #3) | ($\theta_1, \theta_2, \theta_2, \theta_2$) |
| 0100 | Index (5, 6, 9, 10) | (#3, #4, #4, #3) | ($\theta_2, \theta_2, \theta_2, \theta_2$) |
| 0101 | Index (5, 6, 9, 10) | (#3, #4, #4, #3) | ($\theta_3, \theta_2, \theta_2, \theta_1$) |
| 0110 | Index (5, 6, 9, 10) | (#5, #3, #3, #5) | ($\theta_3, \theta_2, \theta_2, \theta_0$) |
| 0111 | Index (5, 6, 9, 10) | (#5, #3, #3, #5) | ($\theta_4, \theta_3, \theta_1, \theta_0$) |
| 1000 | Index (5, 6, 9, 10) | (#5, #3, #3, #5) | ($\theta_3, \theta_2, \theta_1, \theta_0$) |

The beam book shown in Table 1 shows information on a 3×3 beam formed through an antenna panel having a shape of 4×4.

In an NR, the terminal needs to optimize an implementation viewpoint for a Rx beam according to a base station channel. If the Rx beam is operated in a fixed form, loss may occur in terms of performance depending on the scenario of the terminal. Accordingly, in order to improve this, in the disclosure, a method for optimizing the Rx beam (or Rx beam book) of the terminal, based on signaling of the base station and an operation scenario of the terminal will be described. At this time, the optimization of the reception beam (reception beam book) may be equally applied from the viewpoint of the transmission beam (transmission beam book).

Figure 3A:
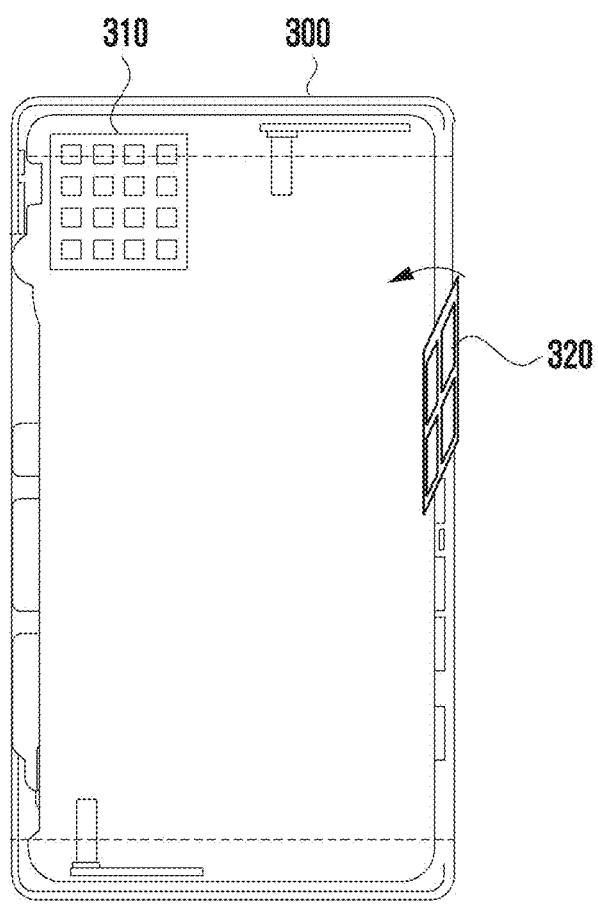
FIGS. 3A and 3B are views illustrating an antenna panel and hardware structure according to various embodiments.
Figure 3B:
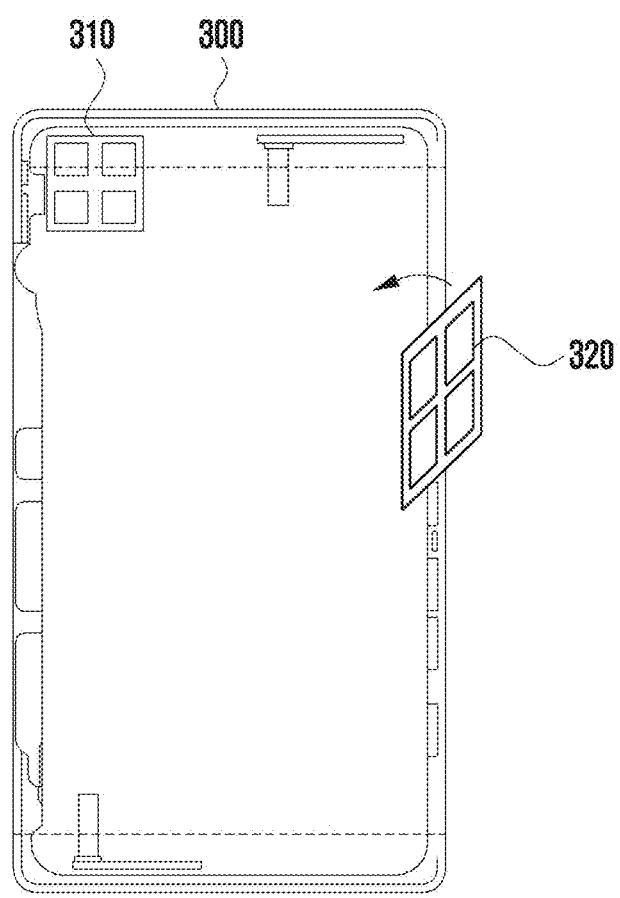

First, FIGS. 3A and 3B are views illustrating antenna panels 310 and 320 and hardware structure of a terminal 300, according to various embodiments. As illustrated in FIGS. 3A and 3B, the terminal 300 may include a plurality of antenna panels 310 and 320. Each of the antennal panels 310 and 320 may include antennal element. At this time, the antenna element may be 9, 16, or 25, and the number of antenna elements included in one antenna panel is not limited. Also, the number of the antenna elements included in each of the first antenna panel 310 and the second antenna panel 320 may be different. In addition, the antenna may include at least a patch type antenna or a dipole type antenna.

For example, as illustrated in FIG. 3A, the first antenna panel 310 may include 16 antenna elements, and the second antenna panel 320 may include four antenna elements. In addition, as illustrated in FIG. 3B, the first antenna panel 310 and the second antenna panel 320 may each include four antenna elements.

When the number of antenna elements is 16 in an arbitrary antenna panel, power adjustment in each antenna element is possible in 7 operations, and when the phase shift can be adjusted in 5 operations, a plurality of beams may be formed. The plurality of beams may be used for calibration purposes. In other words, the plurality of beams may be used in hardware to test whether the arbitrary antenna panel works well. In addition, an Rx beam book may be configured by using some arbitrary number of beams from a plurality of beams.

Hereinafter, a description referred to as a beam book change may be made to change the beam book set, or may be implemented in a form of changing or modifying the configuration of the beam book itself. In other words, the change of the beam book set can also be interpreted as a change or modification of the beam book in a broad sense.

Figure 4A:
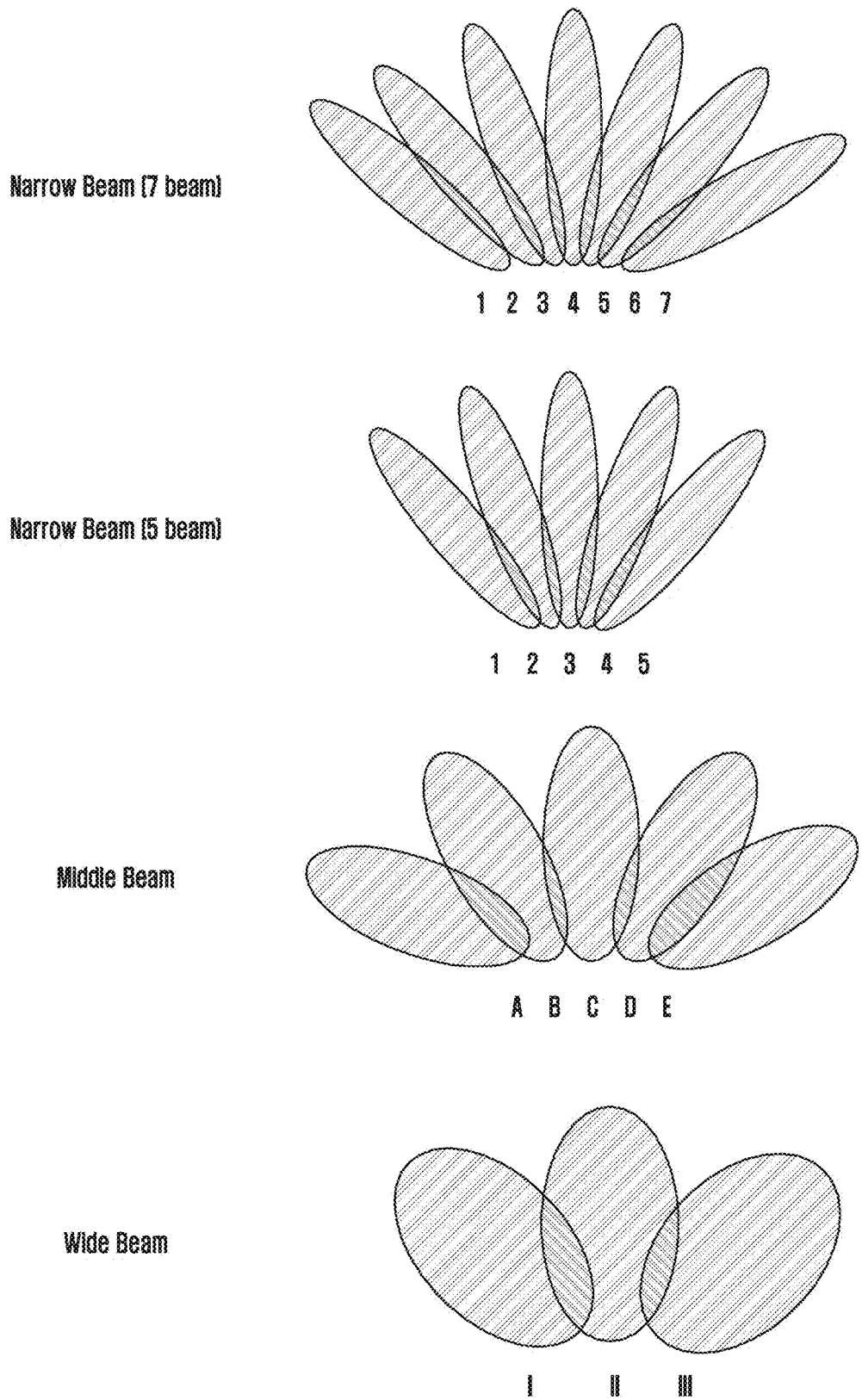
FIGS. 4A and 4B are views illustrating a shape of a beam according to various embodiments.
Figure 4B:
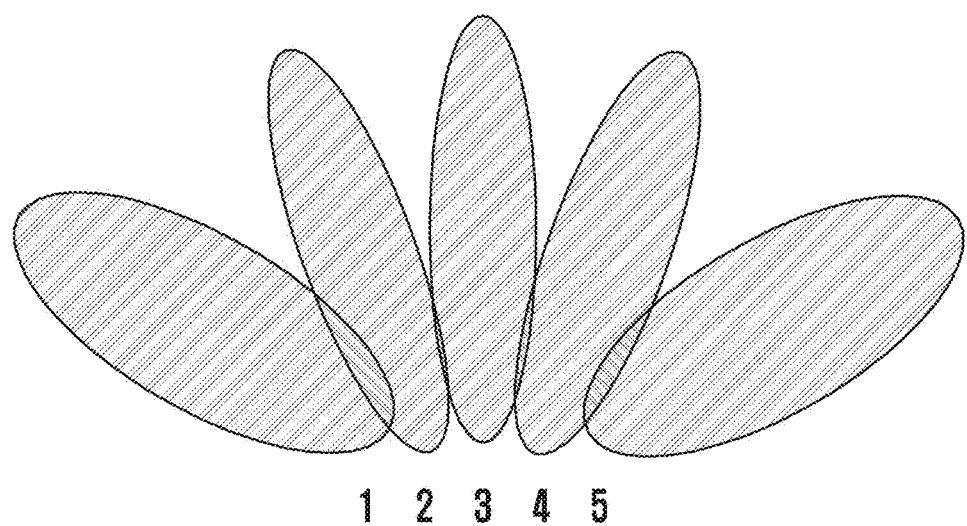
Figure 4B:
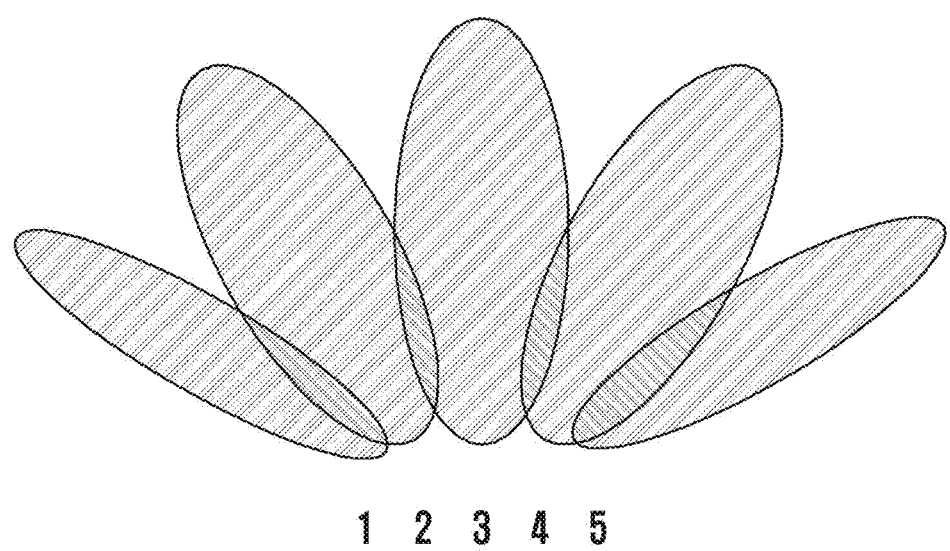

According to various embodiments, the design of the beam book is possible in the form of 3×3, 5×5, and 7×7. For example, assuming a patch antenna, a wide beam may constitute a beam by dividing the entire 180 degree angle into three. The angle between the central axes of each beam may be 45, 60, 75, and the like. The medium beam may constitute a beam by dividing the total 180-degree angle into five. The angle between the central axes of each beam may be 22.5 or 30 degrees. The narrow beam may form a beam by dividing the total 180-degree angle into seven. The angle between the central axes of each beam may be 15, 20, 22.5 degrees, and the like. Various designs of the beam book are as shown in FIG. 4A. In addition, the width of each beam in each design may be different as shown in FIG. 4B.

Meanwhile, the first antenna panel 310 and the second antenna panel 320 may use the same reception beam book, or different beam books. For example, even if the first antenna panel 310 sets the reception beam book in the form of 3×3, the second antenna panel 320 may also configure a reception beam in 5×5 and 7×7 forms as well as 3×3 forms. In other words, when the first antenna panel 310 is configured as a beam book A, the second antenna panel 320 may be configured as A or B.

In another embodiment, in the case that the reception beam book is configured in a 3×3 form in the first antenna panel 310, when the reception beam book of the first antenna panel 310 is changed or modified, the reception beam book of the second antenna panel 320 may be accordingly changed in the same manner. In this case, the first antenna panel 310 and the second antenna panel 320 may be synchronized. Therefore, when the reception beam book of the first antenna panel 310 is changed from A to A', the reception beam book of the second antenna panel 310 may also be changed from A to A'. Alternatively, the reception beam book of the second antenna panel 320 may be changed from B to B'.

In another embodiment, when a reception beam book is formed in the form of 3×3 in the first antenna panel 310, and then the reception beam book of the first antenna panel 310 is changed or modified, accordingly, the reception beam book of the second antenna panel 320 may be changed to a different beam book. In other words, when the beam book of the first antenna panel 310 is changed from A to A', the beam book of the second antenna panel 320 may also be changed from A' to A. Alternatively, the reception beam book of the second antenna panel 320 may be changed from B' to B.

Various embodiments described above may be extended or changed.

Figure 5A:
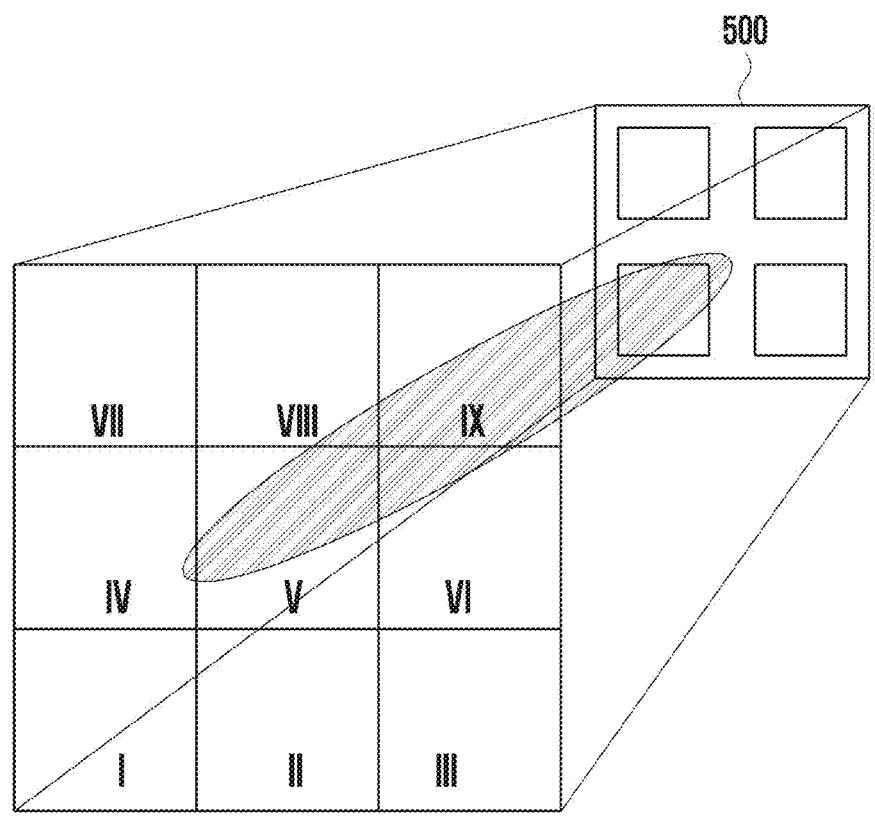
Figure 5B:
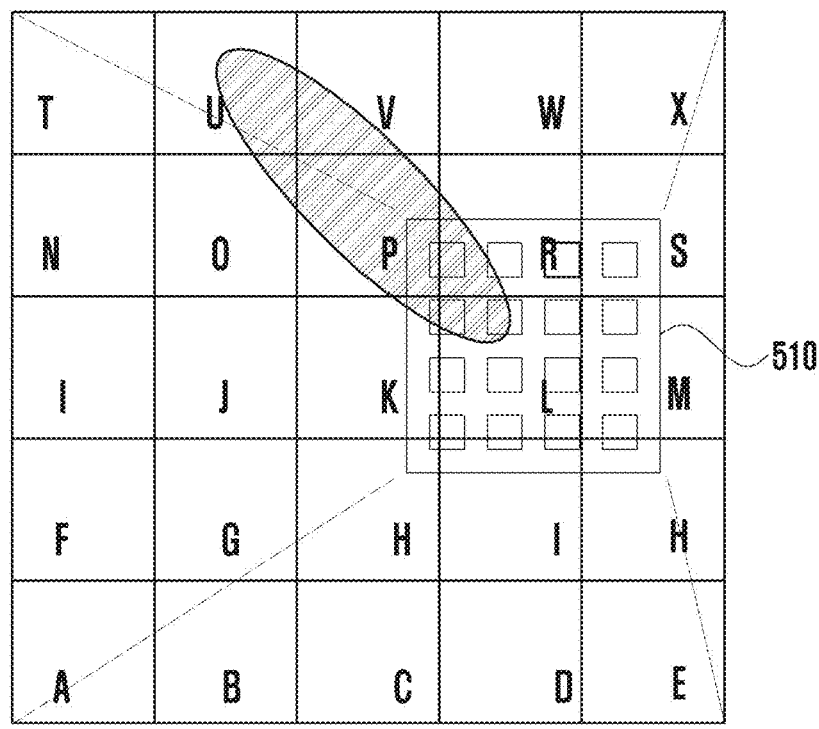

Meanwhile, FIGS. 5A to 5C are views illustrating beamforming according to various embodiments.

FIG. 5A is a view illustrating an antenna panel 500 having four antenna elements that operate a total of 9 beams in 3D by operating a wide beam, according to an embodiment. Even the antenna panel operating the wide beam may operate three beams in a fan shape. In addition, the number of antenna elements included in the antenna panel 500 capable of operating the wide beam is not limited. In other words, an antenna panel including 16 antenna elements can operate a wide beam to operate a total of 9 beams in 3D.

FIG. 5B is a view illustrating an antenna panel 510 having 16 antenna elements that operate a total of 25 beams in 3D by operating a medium beam, according to another embodiment. Even the antenna panel 510 operating the medium beam may operate five beams in a fan shape. In addition, the number of antenna elements included in the antenna panel 510 capable of operating the medium beam is not limited. In other words, an antenna panel including four antenna elements can also operate a medium beam to operate a total of 25 beams in 3D.

Meanwhile, FIG. 5C is a view explaining an antenna panel that operates a total of 49 beams in 3D by operating a narrow beam. Even the antenna panel that operates the narrow beam may operate seven beams in a fan shape. The number of antenna elements included in the antenna panel operating the narrow beam is not limited.

Table 2 below is a table showing a hierarchy mapping method of the beam book based on the contents shown in FIGS. 5A to 5C.

TABLE 2

| Beam level (per plane; | Beam change | | | Beam unchanged |
|---|---|---|---|---|
| | Sharpening | Widening | Changing | |
| Wide beam (three) | I→A, B, F or G<br>II→B, C, D, G, H or I<br>III→D, E, I or H<br>(Duplicates can be excluded) | — | I→II, IV or V<br>II→I, III or IV or V or VI<br>III→II, V or VI | Unchanged, Beam fixed |
| Medium beam (five) | A→8, 9, or 2<br>...<br>K→17, 18, 19, 24, 25, 26, 31, 32 or 33<br>...<br>X→41, 42 or 49 | A, B, F, G→I<br>B, C, D, G, H, I→II<br>D, E, I, H→III | A→B, F or G<br>B→A, F, G, H or C<br>... (Around the beam 1tier) or (Around the beam 2tier) | Unchanged, Beam fixed |
| Narrow beam (seven) | — | 8, 9, or 2→A<br>...<br>17, 18, 19, 24, 25, 26, 31, 32 or 33→K<br>...<br>41, 42 or 49→X | Around the beam 1tier or Around the beam 2tier | Unchanged, Beam fixed |

First, changing the beam from the wide beam as shown in FIG. 5A to the medium beam as shown in FIG. 5B may correspond to sharpening in which the width of the beam is narrowed. As an example of sharpening, the beam corresponding to the position I of FIG. 5A may be narrowed to a beam corresponding to the position A, position B, position F or position G of FIG. 5B. In addition, as an example of changing, the beam corresponding to the position I of FIG. 5A may be changed to a beam corresponding to the position II, the position IV, or the position V.

In addition, changing the beam from a medium beam as shown in FIG. 5B to a narrow beam as shown in FIG. 5C may also correspond to sharpening in which the width of the beam is narrowed. As an example of sharpening, the width corresponding to the position A of FIG. 5B may be narrowed to the beam corresponding to the position 8, position 9, or position 2 of FIG. 5C.

Meanwhile, changing a beam from a medium beam as shown in FIG. 5B to a wide beam as shown in FIG. 5A may correspond to widening in which the width of the beam is widened. As an example of widening, the beam corresponding to the position A, the position B, the position F, or the position G in FIG. 5B may be widened to a beam corresponding to the position I in FIG. 5A.

Meanwhile, as an example of changing, the beam corresponding to the position A of FIG. 5B may be changed to a beam corresponding to the position B, the position F, or the position G.

Changing the beam from the narrow beam as shown in FIG. 5C to the medium beam as shown in FIG. 5B may correspond to widening in which the width of the beam is widened. As an example of widening, the beam corresponding to the position 8, position 9, or position 2 in FIG. 5C may be widened to the beam corresponding to the position A in FIG. 5B.

Although omitted in Table 2, if a narrower beam width can be implemented, the narrow beam shown in FIG. 5C may also be sharpened.

Hereinafter, a control method of a terminal according to an embodiment of the disclosure will be described based on FIG. 6.

First, in operation S600, the terminal may configure a default beam book. For example, when the terminal is shipped, a default beam book may be configured and shipped.

In operation S610, the terminal may perform a radio resource control (RRC) connection with the base station. For example, the terminal may transmit an RRC connection request message to the base station. Accordingly, when the base station transmits an RRC connection setup message to the terminal, the terminal transmits an RRC connection setup complete message to the base station, so that the terminal and the base station can perform an RRC connection.

Although the terminal has been described as configuring the default beam book and performing RRC connection, this is only an example, and the terminal may determine the default beam book at the time of RRC connection.

Then, in operation S620, the terminal may determine whether a predetermined event has occurred. When a predetermined event occurs, the process proceeds to operation S630, where the terminal can change the beam book. The beam book may include both a reception beam book and a transmission beam book. In other words, the terminal may change the reception beam book when a preconfigured event for changing the reception beam book occurs, or may change the transmission beam book when a preconfigured event for changing the transmission beam book occurs.

Hereinafter, a case in which a preconfigured event occurs, based on various embodiments of the disclosure will be described in detail.

First, the terminal may change the beam book according to a resource allocated to the terminal or a frame structure.

Assuming that one received beam measurement is performed during one symbol while the transmission beam is fixed, 49 symbols are needed to measure by sweeping 49 beams. For example, when measuring beams from 14 symbols included in one slot, four slots are needed to sweep all the beams at least once. However, the measurement by sweeping 49 beams is only an example, and the number of beams that are measured by sweeping is not limited to 25, 16, or 9 beams.

At this time, the terminal may change or modify the reception beam book to reduce the time to sweep. Specifically, the terminal may operate the reception beam during X slots.

Figure 7A:
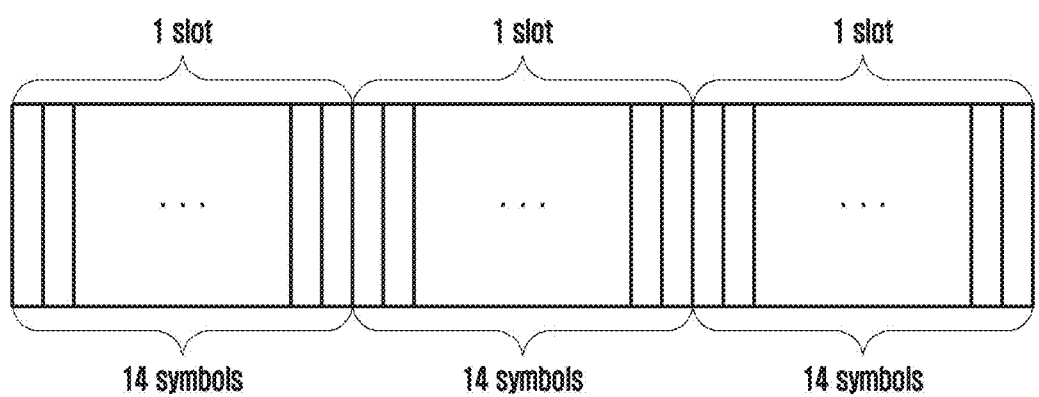
FIGS. 7A and 7B are views illustrating a frame structure for a slot in which a terminal desires to perform a beam sweep according to an embodiment of the disclosure.

Case A) As illustrated in FIG. 7A, if it is desired to measure the reception beam of the terminal with respect to the transmission beam fixed in the three slots, the number of the reception beams of the terminal can be reduced to within 14×3 symbols.

Figure 7B:
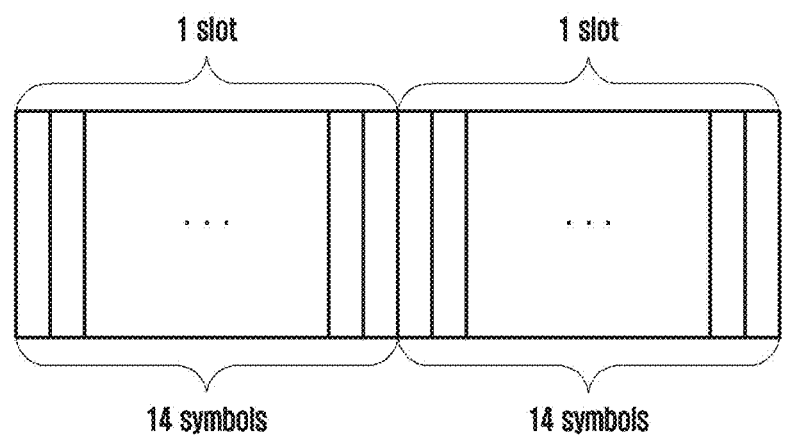

Case B1) If the CSI-RS, the synchronization signal block (SSB), and the CORESET are designed to the same symbol, While trying to measure the reception beam of the terminal with respect to the transmission beam fixed in the two slots as shown in FIG. 7B, the number of the reception beams of the terminal can be reduced to 14×2 or less.

Case B2) If the CSI-RS and the CORESET are not configured to the same symbol, except for the CORESET symbol 2 (pieces), while attempting to measure the reception beam of the terminal with respect to the transmission beam fixed in the two slots, the number of reception beams of the terminal can be reduced to within 12×2.

Case B3) If SSB and CORESET are not designed to the same symbol, except for SSB symbol 4 (pieces), while attempting to measure the reception beam of the terminal with respect to the transmission beam fixed in the two slots, the number of the reception beams of the terminal can be reduced to within 10×2. In other words, the terminal should be able to operate within 20 (e.g., 16 or 9) reception beam books.

Case C1) If CSI-RS, SSB and CORESET are designed in the same symbol, while measuring the received beam of the terminal with respect to the transmission beam fixed in one slot, the number of the reception beams of the terminal can be reduced to 14 or less.

Case C2) If CSI-RS and CORESET are not designed to the same symbol, except for SSB symbol 2 (pieces), while attempting to measure the reception beam of the terminal with respect to the transmission beam fixed in the one slot, the beam can be measured in 12 symbols. In this case, 12 reception beam books should be able to operate.

Case C3) If SSB and CORESET are not designed on the same symbol, while attempting to measure the reception beam of the terminal with respect to the transmission beam fixed in the one slot, beams can be measured on 10 symbols except for SSB symbol 4 (pieces). In this case, it should be possible to operate up to 10 (e.g., 9) reception beam books.

According to the above-described embodiment, in order to change the reception beam book to a beam book that includes information on a smaller number of beams, the terminal may first determine the default received beam book at the time of RRC connection. For example, a set of transmission beam books of the base station may be determined based on the SSB configuration of the base station, reference signal (RS) configuration, or quasi-co-location (QCL) configuration. Furthermore, the terminal can determine the default received beam book. As described above, the default reception beam book may be configured at the time of shipment of the terminal. As described above, the default beam book may be a beam book including information on 3, 5, 7, 9, 25 or 49 beams depending on the beam shape (or beam width).

Meanwhile, the terminal may additionally configure a beam book. For example, the terminal may configure an additional beam book in association with a default beam book or independently of the default beam book. Specifically, the terminal may configure a beam book for performing measurement on 20 symbols as an additional beam book in preparation for a case where one CORESET may be configured, while configuring a beam book including information on 25 beams as a default beam book.

For example, the terminal may configure a beam book including information on 9 beams in a 3×3 format or a beam book including information on 16 beams in a 4×4 format as the additional beam book.

Figure 8A:
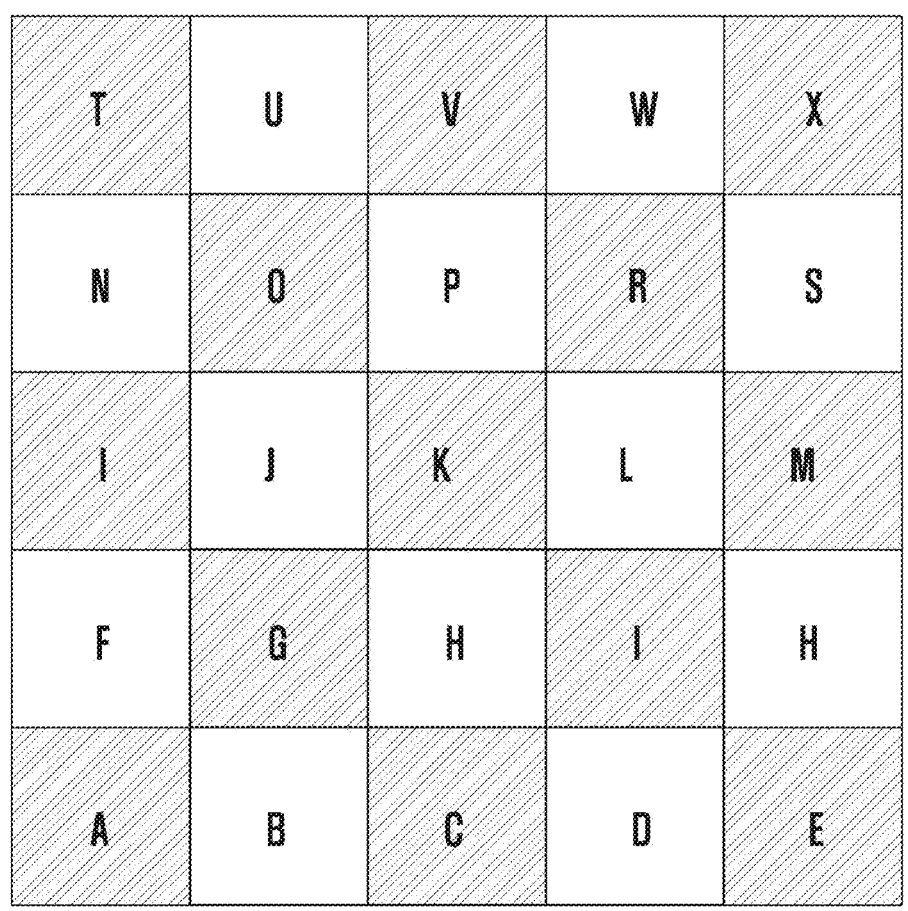

As another example, the terminal may configure the additional beam book by selecting information on some beams from a beam book that includes information on 25 beams. For example, as illustrated in FIG. 8A, the terminal may configure an additional beam book including information on alternately positioned beams so that the beams can be included in an even distribution. An additional beam book including information on the beam shown in FIG. 8A may include information on 13 beams.

Figure 8B:
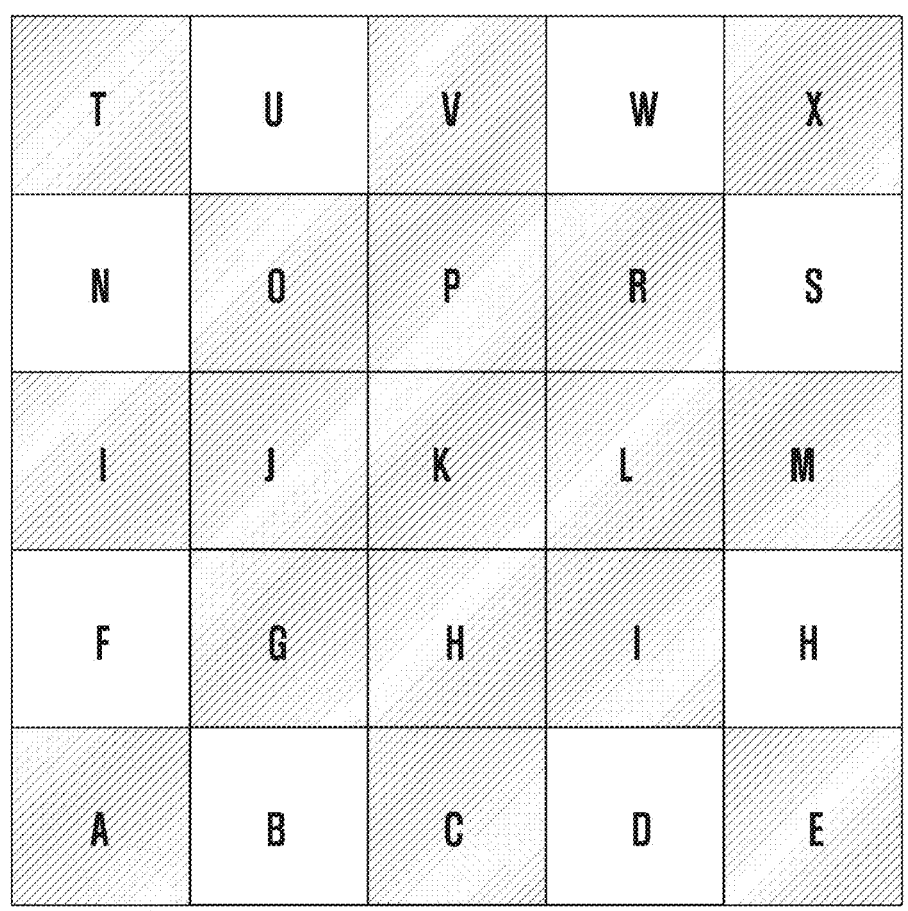
Figure 8C:
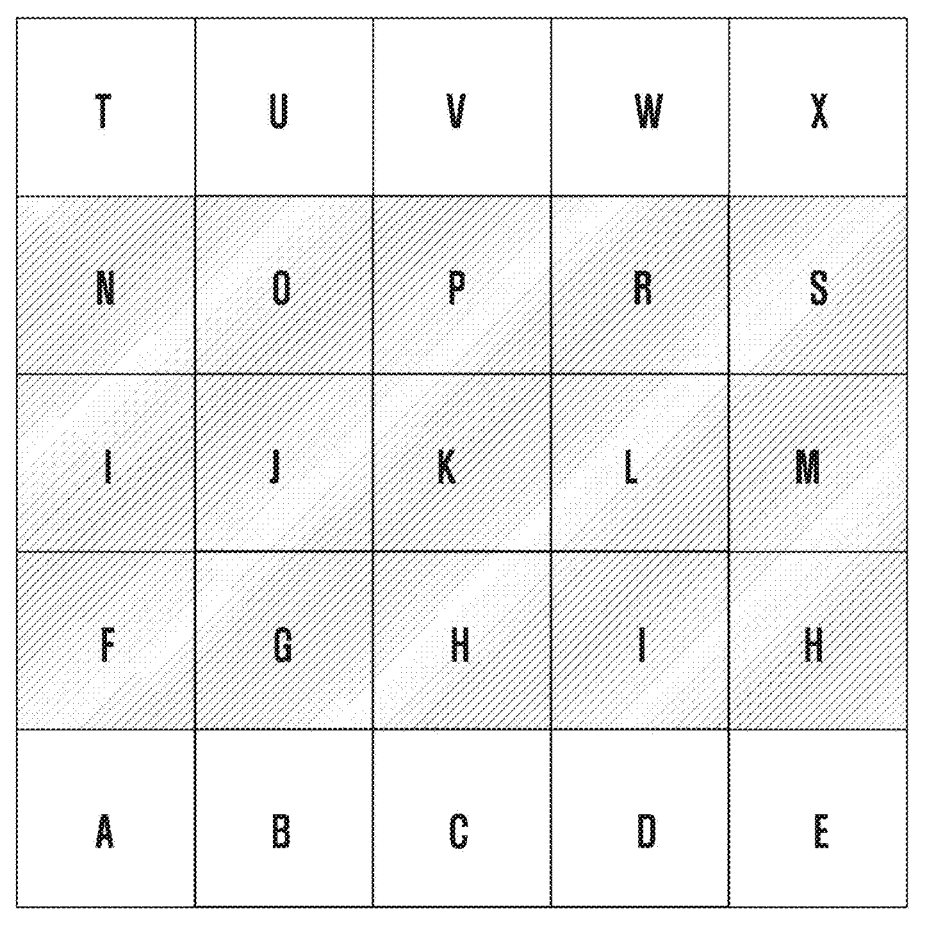

Alternatively, an additional beam book including information on the beam as shown in FIG. 8B or 8C may be configured to exclude information on the beam that is determined to be relatively insignificant or to include information on the beam that is determined to be more important. The additional beam book including information on the beam illustrated in FIG. 8B may include information on 17 beams. In addition, the additional beam book including information on the beam illustrated in FIG. 8C may include information on 15 beams.

Alternatively, a set for a case where a terminal wants to quickly scan a received beam book in a slot may be included. In this case, a beam book including information on up to 14 beams may be selected. In addition, a beam book including information on up to 12 or 10 beams may be selected according to the number of symbols of CORESET or SSB. This beam book of 3×3 format can be configured, and 14 beams out of 25 can be extracted. In this case, 14 beams may be selected by alternately selecting information about the beam.

Meanwhile, the width of the beam in the above-described content may be composed of 2 or 3. For example, the beam can be a narrow beam, a medium beam, a wide beam, or the like.

Figure 6:
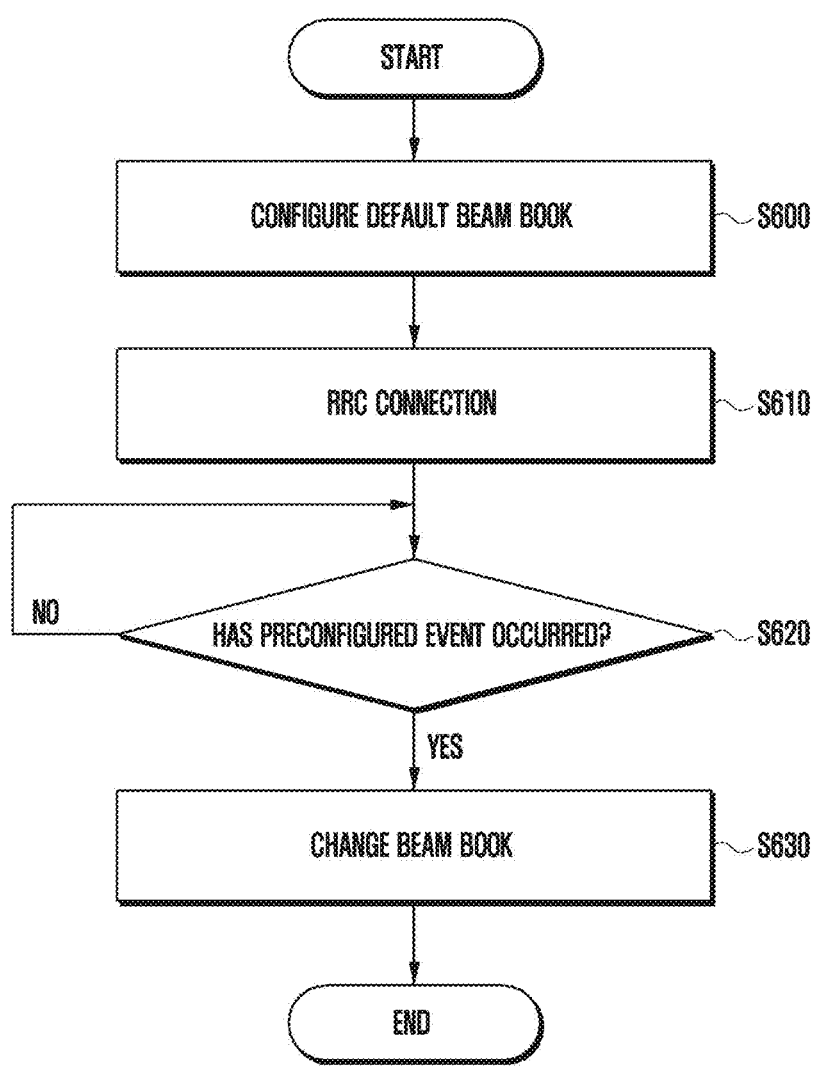
FIG. 6 is a flowchart illustrating a control method of a terminal according to an embodiment of the disclosure.

In addition, the beam book may be further updated after operation S610 of FIG. 6. At this time, a part of the beam book of the terminal may be changed adaptively. For example, some beams corresponding to O, P, R, J, K, L, G, H, and I of FIG. 8A may be updated in the form of FIG. 8B. Alternatively, instead of the V Rx beam of 3×3 in FIG. 5A, it may be configured by changing to a beam corresponding to O, P, R, J, K, L, G, H, I in FIG. 5B (partial beam book change update).

At this time, the beam book design may include all combinations considered in FIGS. 4A and 4B. In addition, the above-described contents may be additionally applied in the proposal contents described later.

According to another embodiment of the disclosure, the terminal may change or modify the reception beam book according to the initial access operation and the RRC configuration.

First, in the initial access section, by using the beam configuration P1 (BM configuration P1), the terminal can utilize the default beam book set as the default. In addition, a beam pair link between the base station and the terminal may be determined based on the basic beam book. The reception beam book (Rx beam book) used to determine the determined transmission beam (Tx beam) of the base station and the reception beam (Rx beam) of the terminal may be continuously used while monitoring the PDCCH.

Meanwhile, reference signal (RS) configuration by RRC configuration or RS reconfiguration by RRC reconfiguration may be performed.

In the RRC configuration, the beam book of the terminal may be operated and changed/modified according to the configuration of QCL type D (spatial QCL) and the configuration of transmission configuration information (TCI).

Alternatively, the K beam for the PDCCH may be configured in the TCI states obtained in the RRC configuration, wherein the terminal may update the reception beam book in consideration of the K. For example, in order for the base station to operate the beam in the RRC configuration, the base station may transmit a TCI state including information on the identifier to which the beam is mapped, so that the terminal can receive the PDDCH.

At this time, the terminal may select a number of reception beam books larger than K in consideration of the K. For example, when the K value is 8, the number of beams included in the reception beam book may be selected as a value greater than 8 (e.g., 3×3). When the K value is 16, a value in which the number of beams included in the reception beam book is 16 or more (e.g., 4×4, 5×5 or 7×7) may be selected.

In the above example, an example in which the number of received beam books is configured to be larger than the set transmission beam value is given, but is not limited to the above value. For example, the terminal may update the beam book according to the K value. If K is 4, the beam book is configured as A, and if K is 8, it can be changed to B.

Alternatively, a $2^N$ beam for PDSCH may be configured in TCI states obtained in RRC configuration. At this time, the terminal may update the reception beam book in consideration of the $2^N$. The update of the reception beam book considering the $2^N$ may select a number of reception beam books greater than $2^N$. For example, when the $2^N$ value is 16, the number of beams constituting the reception beam book may be selected as a value greater than 16 (e.g., 5×5 or 7×7). Alternatively, when the $2^N$ value is 25, a value in which the number of beams constituting the reception beam book is 25 or more (e.g., 7×7) may be selected.

In the above example, an example in which the number of reception beam books is configured to be greater than the configuration value of the transmission beam is given, but the disclosure is not limited thereto. For example, a reception beam book including information on a number of beams equal to or less than the configured number of transmission beams may be selected.

Meanwhile, the terminal may configure the reception beam book for the beam for the PDCCH and the beam for the PDSCH, respectively, but may preferentially determine the beam book for the PDCCH over the beam book for the PDSCH. For example, if a reception beam book for receiving a PDCCH is configured, a PDSCH can be received using the configured reception beam book.

Conversely, a beam book for PDSCH may be preferentially determined over a beam book for PDCCH. In this case, when a reception beam book for receiving a PDSCH is configured, a PDCCH can be received using the configured reception beam book.

Meanwhile, BM configuration P2 is a configuration for a scenario in which the width of a beam is changed or deformed, such as when a wide beam/medium beam is changed to a medium beam/narrow beam. For example, the base station may perform beam sweep for the purpose of changing the narrow beam for throughput enhancement of the terminal. In other words, during the periodic CSI-RS measuring, the terminal may perform two operations.

First, a method of using the same reception beam book previously used will be described.

Figure 9:
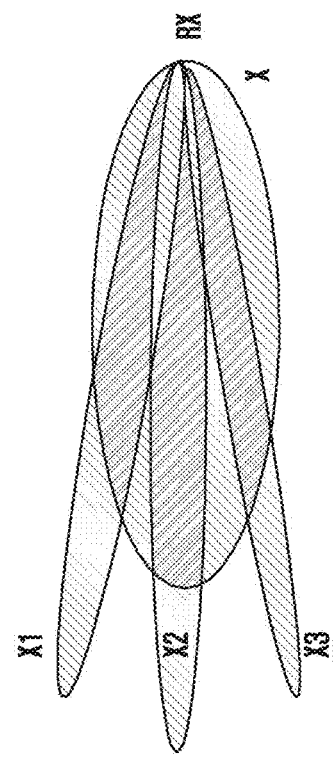
FIG. 9 is a view illustrating a combination of beam operations between a base station and a terminal according to an embodiment of the disclosure.
Figure 9:
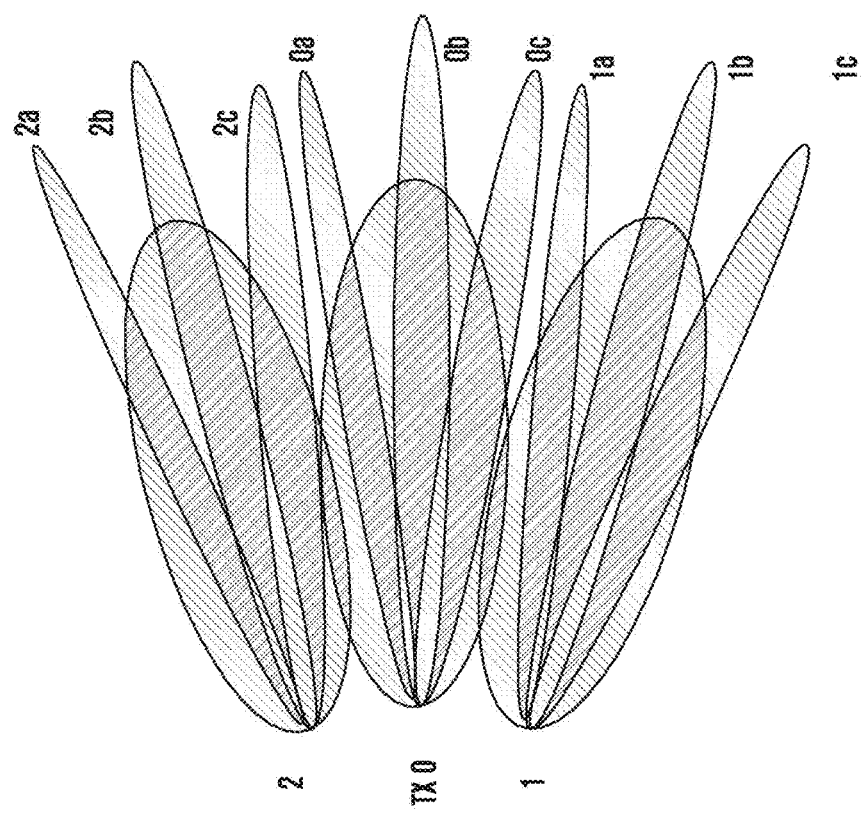

As shown in FIG. 9, a base station can sweep the transmission beam to 0, 1, 2. The periodic CSI-RS/semi-persistent (SP) CSI-RS may change the transmission beam in the form of 0, 1, 2, . . . using at least one symbol within at least one slot. At this time, the terminal may utilize a basic beam book having a wide or medium beam width such as 3×3 or 5×5.

As another embodiment, as shown in FIG. 7 below, the base station may sweep the transmission beam into narrow beams within 0 beams. Specifically, the periodic/SP CSI-RS may change the transmission beam to in the form of 0, 0a, 0b, 0c using at least one symbol in at least one slot. At this time, 0 beam may or may not be included. At this time, the terminal may utilize a basic beam book having a wide or medium beam width such as 3×3 or 5×5.

According to another embodiment, the terminal may change or modify the beam book to a reception beam book composed of narrow beams.

As shown in FIG. 9, the base station may sequentially configure or fix the transmission beams in order of 0, 1, and 2. The periodic/SP CSI-RS may sequentially configure or fix the transmission beam to 0 and the beam in sequence using consecutive symbols within at least one slot. The terminal can sweep the beam in the form of X (can be removed), X1, X2, X3. X may utilize a basic beam book having a wide or medium beam width, and X1, X2, and X3 may be changed/transformed into a beam book having a medium or narrow beam width.

The terminal may repeatedly determine a transmission beam of the base station, based on a parameter transmitted by the base station, and operate based on the determination result. For example, the terminal may utilize the CSI-RS-ResourceRep parameter. Specifically, when the CSI-RS-ResourceRep of the RRC parameter in the higher layer is configured as 'ON' or 'OFF' in MAC CE or downlink control information (DCI), the terminal may operate to change/modify the beam book, based on the above configuration.

According to another embodiment, in FIG. 9, the base station may sequentially configure or fix the transmission beams as 0a, 0b, and 0c. The periodic/SP CSI-RS may configure or fix the transmission beam to 0a using consecutive symbols in at least one slot. The terminal may sweep the beam in the form of X (can be removed), X1, X2, X3. X may utilize a basic beam book having a wide or medium beam width, and X1, X2, and X3 may be changed/modified into a beam book having a medium or narrow beam width.

The terminal may repeatedly determine a transmission beam of the base station, based on a parameter transmitted by the base station, and operate based on the determination result. For example, the terminal may utilize the CSI-RS-ResourceRep parameter. Specifically, if the CSI-RS-ResourceRep of the RRC parameter in the higher layer is configured as 'ON' or 'OFF' in MAC CE or DCI, the terminal may operate to change/modify the beam book, based on the above configuration.

Meanwhile, according to another embodiment of the disclosure, in the above description, the terminal may be configured by changing/modifying the reception beam book to a beam book constituting the same narrow or wide beam depending on the situation. At this time, the terminal may use the same beam book as the configured beam book when determining the reception beam book for the PDCCH.

Figure 10A:
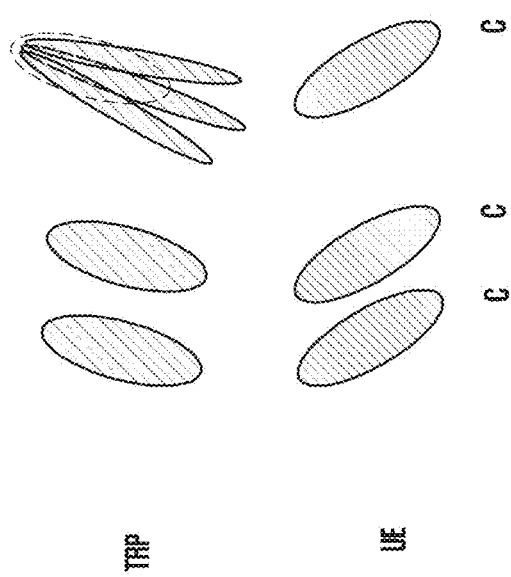
FIGS. 10A and 10B are views illustrating allocation of resources and changes in beams of a base station and a terminal for the allocated resources according to an embodiment of the disclosure.
Figure 10A:
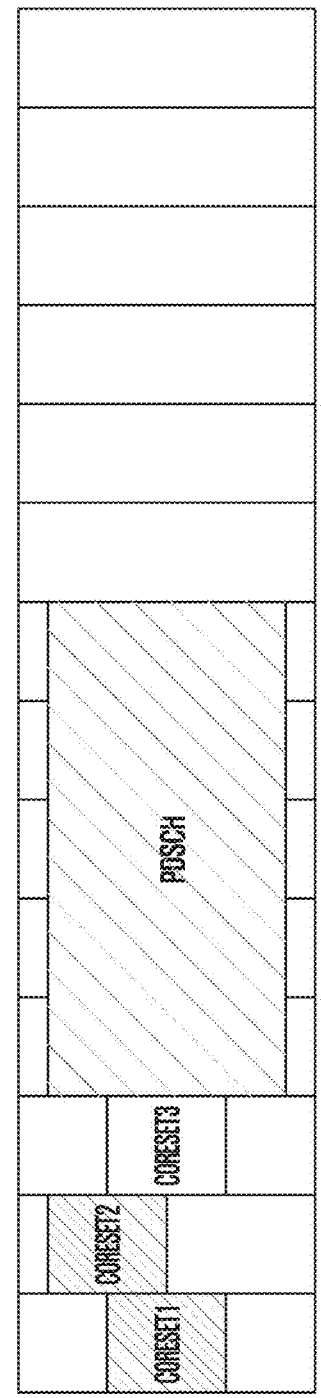
Figure 10B:
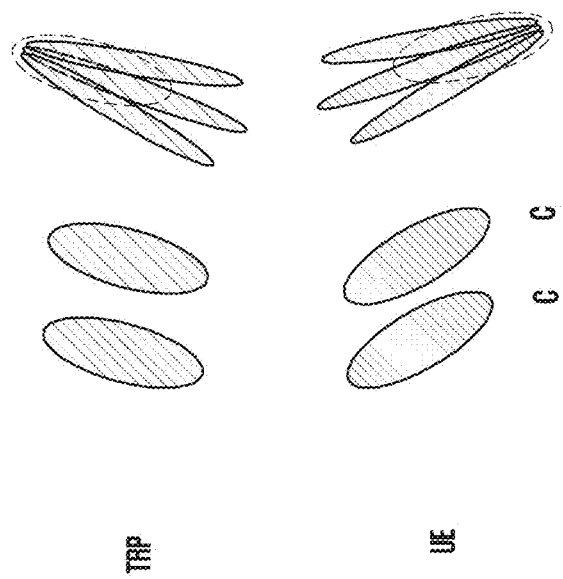
Figure 10B:
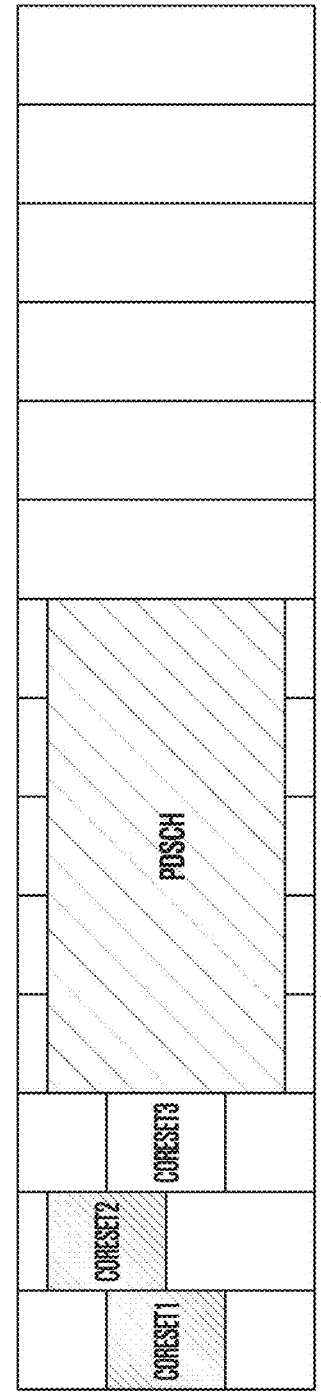

Hereinafter, a method for changing/modifying a reception beam book of a terminal according to DCI signaling will be described based on FIGS. 10A and 10B. FIGS. 10A and 10B are views illustrating a change and a frame structure of a reception beam of a terminal and allocated resources.

As described in FIGS. 10A and 10B, a transmission beam corresponding to PDCCH and PDSCH transmitted by a base station may be different. For example, when the width of the beam transmitted by the base station is narrower in the PDSCH transmission interval than in the transmission interval of the control resource set (CORESET), as shown in FIG. 10A, the terminal may maintain the reception beam book as it is. On the other hand, as shown in FIG. 10B, the terminal may change the reception beam book corresponding to the PDSCH transmission period from the first beam book to the second beam book.

As described above in FIG. 9, in the BM configuration P2/P3, when the transmission beams are 0a, 0b, 0c, 1a, 1b, 1c, 2a, 2b, 2c at 0, 1, 2 in beam switch transmission, and the reception beams are X1, X2, and X3, they may correspond.

If the RRC parameter in the higher layer is "Is-TCI-Present=True" by performing PDCCH decoding in the CORESET, the terminal may change the beam according to the TCI field value in DCI (e.g., 3 bits). For example, when the transmission beam is changed from 0 to 0a as shown in FIG. 10B, the terminal may maintain the beam as a wide beam or a medium beam, such as beam X, for PDCCH reception. Alternatively, the terminal may change the reception beam book to a medium beam or a narrow beam as in beam X1 for PDSCH reception.

In addition, if the RRC parameter is "Is-TCI-Present=False" in the higher layer by performing PDCCH decoding in the CORESET, the transmission beam of the base station may fall back according to this condition. For example, the transmission beam may be changed from 0a to 0. At this time, the terminal may maintain the beam in the medium beam or narrow beam as in beam X1 for PDSCH reception. Alternatively, the terminal may fall back the reception beam book in a wide beam or a medium beam, such as beam X, for PDSCH reception.

According to an embodiment, the terminal may manage the reception beam book for receiving the PDSCH and the reception beam book for receiving the PDCCH in the same manner or may separately manage them. For example, if a separate falling back does not exist when the beam book is changed based on a specific time point, the terminal may use the continuously modified beam book for reception of the PDCCH or PDSCH. However, if the terminal separately manages the reception beam book for the reception of the PDSCH and the PDCCH, falling back may affect only the PDSCH operation.

According to another embodiment of the disclosure, the terminal may change the reception beam book when performing beam failure detection or beam failure declaration.

For example, if reception of all PDCCHs among at least one PDCCH transmitted by the base station fails, the terminal may perform beam failure detection or beam failure declaration. In addition, when performing a beam failure confirmation or declaration, the terminal may change to the second beam book including information on a greater number of beams than the first beam book.

Specifically, if the terminal fails to receive all PDCCHs among at least one PDCCH received from the serving base station, and the reception failure of the PDCCH continues for a predetermined time or more, the terminal may perform beam failure confirmation or declaration. At this time, the terminal should additionally sweep a candidate Tx beam of a new base station. Accordingly, the terminal may change the beam book used by the terminal based on the beam failure declaration. For example, a terminal that has previously used a medium beam book can change the reception beam book to a wide beam book for fast beam failure recovery after a beam failure declaration. As a result, the terminal can quickly perform the reception beam sweep in a predetermined time window.

According to another embodiment of the disclosure, the terminal may change the reception beam book in the RRC idle mode or in the wake up phase in the idle mode. An example in which the terminal is receiving a signal in the first beam book and entering an idle mode in the connected mode will be described. At this time, in order to receive a paging signal in the idle mode, the terminal may change to the second beam book including information on fewer beams than the first beam book.

Figure 11:
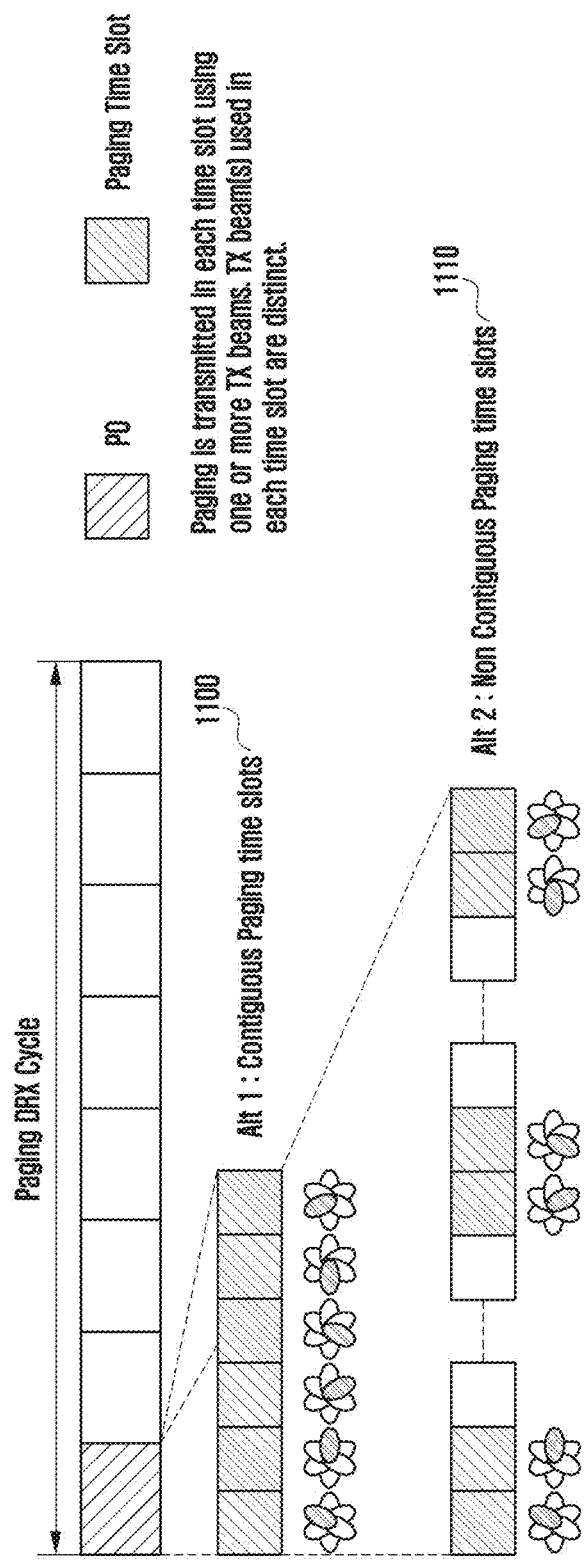
FIG. 11 is a view illustrating a beam scenario of a terminal in an idle mode according to an embodiment of the disclosure.

Specifically, in SSB information transmitted from the base station, location-related information of a common CORESET may be included and transmitted. The terminal may identify the beam-related information of Common CORESET, based on the received information. The beam-related information may include the location of the Common CORESET and the index of the corresponding beam. As shown in FIG. 11, paging information may be configured in the form of continuous paging time slots such as alt 1 (1100), or non-continuous paging time slots such as alt 2 (1110). The terminal receiving the SSB information may change or modify the reception beam book, based on the received information. For example, when using a beam book having a wide beam width, the possibility of receiving a CORESET necessary to receive information on paging of a terminal may increase. If the beam or beam book used in the connection mode was operated using a medium beam or a narrow beam (e.g., X1, X2, or X3 in FIG. 9 described above), when entering the idle mode, the terminal may change the beam book to a beam book composed of a wide beam (e.g., X in FIG. 9 described above).

If the beam sweeping in all directions for paging of the base station is repeated at least two times as shown in FIG. 11, the terminal may change the reception beam or the reception beam book, based on this information. For example, when the first beam sweep is the reception beam X of the terminal, the second beam sweep may be operated as X+1 (change of Rx beam) or X1 (change of RX beam book). When the number of times the beam sweeping is performed is plural, it is possible to operate the reception beam using such a hierarchy.

In addition, if the resource to which the SSB is allocated is the same as the paging time slot as shown in FIG. 11 (FDMed on resources), the terminal may use the same reception beam book in the common CORESET section for paging through SSB monitoring. At this time, the terminal may reuse the beam book configured for initial use.

Figure 12:
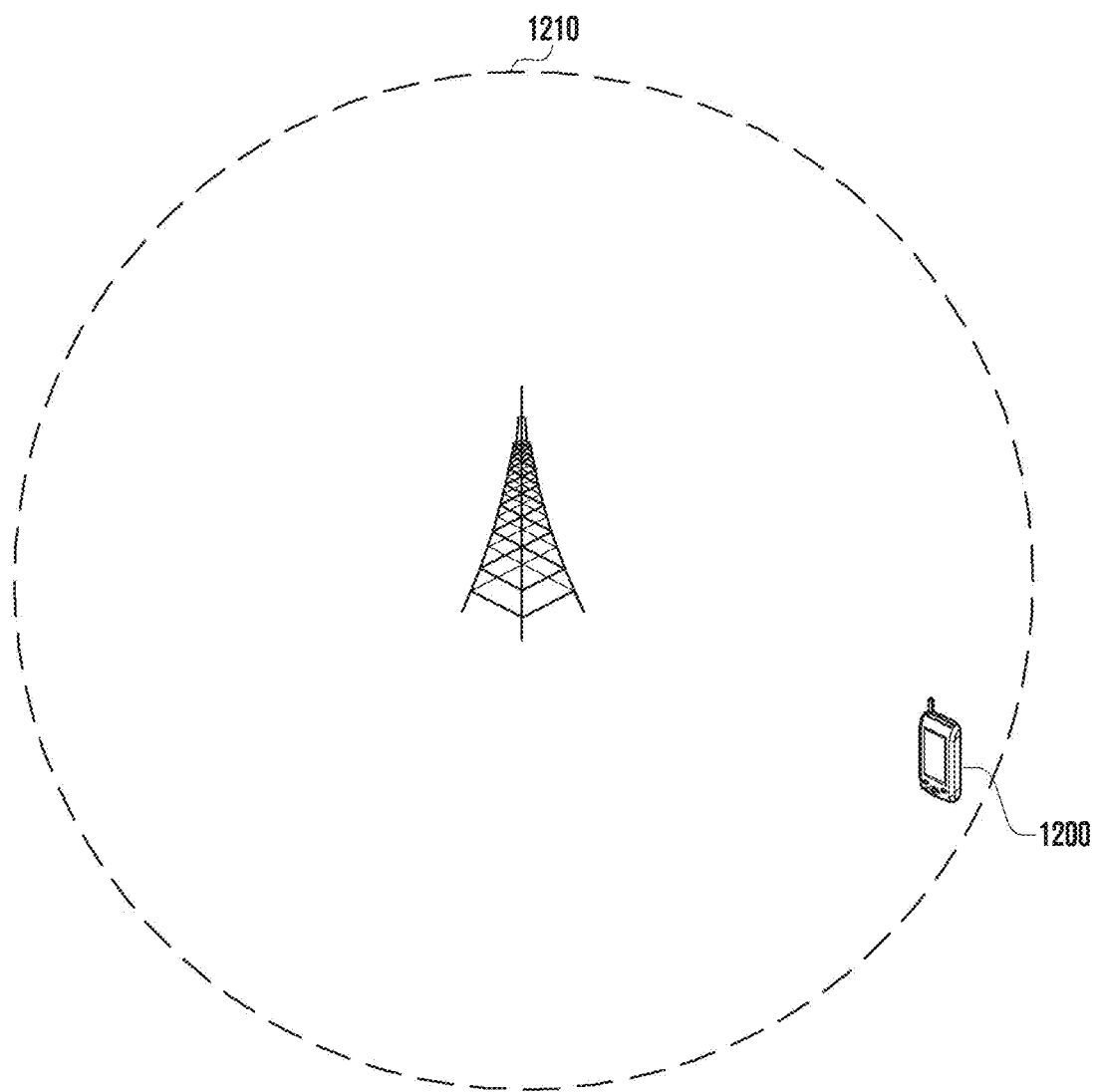
FIG. 12 is a view illustrating a terminal existing at a cell edge according to an embodiment of the disclosure.

According to another embodiment of the disclosure, the beam book may be changed according to the location of the terminal 1200. Specifically, as illustrated in FIG. 12, when the terminal 1200 is located at the cell edge of the cell 1210, the terminal 1200 may determine that power enhancement is required. Accordingly, the terminal 1200 may change the reception beam book to include information about the narrow-shaped beam.

In determining that the terminal 1200 is located at the edge of the cell 1210, it may be determined using a received signal strength indicator (RSSI), a reference signal received power (RSRP), and a reference signal received quality (RSRQ) value by utilizing an omni beam. Alternatively, the terminal 1200 may determine whether it is present at the cell edge, based on at least one of the received global positioning system (GPS) signal and the signal strength received from other base stations located in the vicinity.

In a scenario in which the terminal requires power enhancement, when the reception beam book of the terminal is changed to form a narrow beam width, the terminal 1200 may preferentially change the PDSCH. In addition, the terminal 1200 may additionally change the PDCCH.

Modification of the reception beam book of the terminal described according to an embodiment of the disclosure may be designed in a hierarchical form of one reception beam book. In addition, the hierarchical single reception beam book form may be applied to the above-described embodiments.

In the above-described method, the reception beam or the reception beam book of the terminal is operated according to the transmission beam information, signaling, and scenario situation of the base station to minimize the reception sensitivity and beam sweep operation of the terminal and to reduce the power consumption of the terminal.

Figure 13:
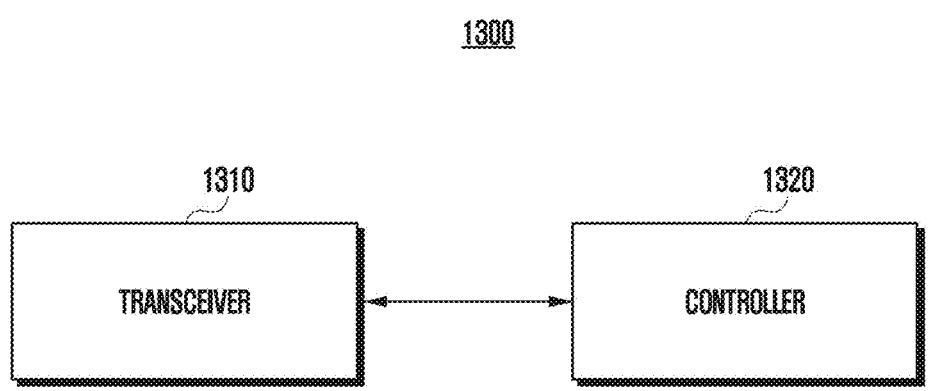
FIG. 13 is a block diagram illustrating the components of a terminal according to an embodiment of the disclosure.

FIG. 13 is a block diagram illustrating the components of a terminal according to an embodiment of the disclosure.

The terminal 1300 may include a transceiver 1310 and a controller 1320.

The transceiver 1310 is a component for transmitting and receiving signals. The terminal 1300 may transmit/receive a signal to/from a base station or another terminal through the transceiver 1310.

The controller 1320 may control the terminal 1300 as a whole. Specifically, the controller 1320 controls the transceiver 1310 to receive radio resource control signaling (RRC signaling) for a signal to be measured by the terminal 1300, identify the number of slots through which the signal to be measured by the terminal is transmitted, based on the received RRC signaling, identify a preconfigured first beam book, and compare the predetermined number of slots through which the first beam book and the signal to be measured are transmitted to determine whether to change the first beam book to a second beam book.

Meanwhile, when the number of beams transmitted according to the first beam book is less than the number of the identified slots, the controller 1320 may determine to change to the second beam book that includes information on a smaller number of beams than the first beam book.

At this time, the signal to be measured of the terminal 1300 may be characterized in that it includes at least one of CSI-RS and SSB.

In addition, the second beam book may be formed by selecting information on an arbitrary number of beams from information on a plurality of beams included in the first beam book.

Meanwhile, the controller 1320 may identify a beam configured to receive a physical downlink control channel (PDCCH) and a physical downlink shared channel (PDSCH), based on the received RRC signaling, and may determine whether to change the first beam book to the second beam book, based on the beam configured for the PDCCH and the PDSCH.

According to another embodiment of the disclosure, the controller 1320 may identify a first beam book including information on the configured plurality of beams, and may change the first beam book to a second beam book when an event in which the number of transmit and reception beams is changed occurs.

In addition, when the width of the beam transmitted from the base station is narrower in the PDSCH transmission period than in the control resource set (CORESET), the controller 1320 may change the reception beam book of the terminal 1300 corresponding to the PDSCH transmission period from the first beam book to the second beam book.

In addition, when reception of all PDCCHs among at least one PDCCH transmitted by the base station has failed, the controller 1320 may perform a beam failure declaration, and when performing the beam failure declaration, may change to the second beam book including information on a greater number of beams than the first beam book.

In addition, when the terminal 1300 enters an idle mode from a connected mode, in order to receive a paging signal in the idle mode, the controller 1320 may change to the second beam book including information on fewer beams than the first beam book.

Specifically, based on at least one of a received signal strength indicator (RSSI), a reference signal received power (RSRP) value, a reference signal received quality (RSRQ) value, a received global positioning system (GPS) signal, and a signal strength received from another base station, the controller 1320 may identify whether the terminal 1300 exists at a cell edge, and may change to the second beam book including information on a greater number of beams than the first beam book When the terminal 1300 is present at the cell edge.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. The electronic device according to embodiments of the disclosure is not limited to those described above.

It should be appreciated that various embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via another element (e.g., third element).

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

The invention claimed is:

1. A control method of a terminal in a wireless communication system, the method comprising:
   receiving radio resource control (RRC) signaling for a signal measured by the terminal;
   identifying a transmission interval of the signal measured by the terminal, based on the received RRC signaling;
   identifying first information for forming a preconfigured beam; and
   determining whether to change the first information for forming the beam to second information for forming a beam, based on the identified transmission interval,
   wherein the identifying the transmission interval of the signal measured by the terminal comprises identifying the number of slots or symbols to which the signal measured by the terminal is transmitted,
   wherein the determining comprises determining by comparing the number of beams of the first information for forming the beam and the number of slots or symbols to which the signal measured by the terminal is transmitted,
   wherein the signal measured by the terminal comprises at least one of channel state information-reference signal (CSI-RS) and synchronization signal/broadcast block (SSB),
   wherein the second information for forming the beam is formed by selecting information on an arbitrary number of beams from information on a plurality of beams included in the first information for forming the beam,
   wherein the determining comprises:
   determining to change to the second information for forming the beam including information on a smaller number of beams than the first information for forming the beam in case that the number of beams transmitted according to the first information for forming the beam is less than the number of the identified slots.

2. The method of claim 1, further comprising:
   identifying a beam configured to receive a physical downlink control channel (PDCCH) and a physical downlink shared channel (PDSCH), based on the received RRC signaling,
   wherein the determining comprises determining whether to change the first information for forming the beam to the second information for forming the beam, based on the beam configured for the PDCCH and the PDSCH.

3. A terminal in a wireless communication system, the terminal comprising:
   a transceiver configured to transmit and receive a signal; and
   a controller configured to control the transceiver to receive radio resource control signaling (RRC signaling) for a signal measured by the terminal, identify a transmission interval of a signal measured by the terminal, based on the received RRC signaling, identify first information for forming a preconfigured beam, and determine whether to change the first information for forming the beam to second information for forming a beam, based on the identified transmission interval,
   wherein the signal measured by the terminal comprises at least one of channel state information-reference signal (CSI-RS) and synchronization signal/broadcast block (SSB), and
   wherein the second information for forming the beam is formed by selecting information on an arbitrary number of beams from information on a plurality of beams included in the first information for forming the beam,
   wherein the controller identifies the number of slots and symbols to which the signal measured by the terminal is transmitted, compares and determine the number of the beam of the first information for forming the beam and the number of the slots or symbols to which the signal measured by the terminal is transmitted,
   wherein the controller determines to change to the second information for forming the beam including information on a smaller number of beams than the first information for forming the beam, in case that the number of beams transmitted according to the first information for forming the beam is less than the number of the identified slots.

4. The terminal of claim 3, wherein the controller:
   identifies a beam configured to receive a physical downlink control channel (PDCCH) and a physical downlink shared channel (PDSCH), based on the received RRC signaling, and
   determines whether to change the first information for forming the beam to the second information for forming the beam, based on the beam configured for the PDCCH and the PDSCH.

* * * * *